United States Patent
Cook et al.

(10) Patent No.: US 8,921,447 B2
(45) Date of Patent: Dec. 30, 2014

(54) PHOTO-ENFORCED STRATIFICATION OF POLYMERIC MATERIALS

(75) Inventors: Clinton J. Cook, Coralville, IA (US); C. Allan Guymon, Iowa City, IA (US)

(73) Assignee: The University of Iowa Research Foundation, Iowa, IA (US)

(*) Notice: Subject to any disclaimer, the term of this patent is extended or adjusted under 35 U.S.C. 154(b) by 91 days.

(21) Appl. No.: 13/082,887

(22) Filed: Apr. 8, 2011

(65) Prior Publication Data

US 2011/0251299 A1 Oct. 13, 2011

Related U.S. Application Data

(60) Provisional application No. 61/322,034, filed on Apr. 8, 2010.

(51) Int. Cl.
| | | |
|---|---|---|
| *C08F 2/46* | (2006.01) | |
| *C08J 3/28* | (2006.01) | |
| *C08F 220/10* | (2006.01) | |
| *C08F 2/48* | (2006.01) | |
| *C09D 133/14* | (2006.01) | |
| *C08F 220/28* | (2006.01) | |
| *C08F 220/14* | (2006.01) | |

(52) U.S. Cl.
CPC ............. *C08F 2/48* (2013.01); *C08F 2220/281* (2013.01); *C08F 220/14* (2013.01); *C09D 133/14* (2013.01)
USPC ........... 522/178; 522/111; 522/112; 522/173; 522/182; 522/184; 522/40; 522/44; 522/74; 522/75; 522/83; 526/75; 526/72; 526/310; 526/320; 526/321; 526/322; 526/323.2; 526/325; 526/328.5; 526/329.7; 526/329; 526/329.5; 524/555; 524/556; 524/558; 524/560; 524/561; 524/562; 524/559; 524/564

(58) Field of Classification Search
USPC ........... 522/111, 112, 173, 178, 182, 184, 40, 522/44, 74, 75, 81, 83; 526/72, 75, 310, 526/312, 319, 320, 321, 322, 323.2, 325, 526/328.5, 329.7, 329, 329.5; 524/555, 524/556, 558, 560, 561, 563, 562, 564, 599
See application file for complete search history.

(56) References Cited

U.S. PATENT DOCUMENTS

| | | | | |
|---|---|---|---|---|
| 3,857,768 A | * | 12/1974 | Kagiya et al. ................. | 522/116 |
| 3,895,949 A | * | 7/1975 | Akamatsu et al. ......... | 430/275.1 |
| 5,011,624 A | * | 4/1991 | Yamagishi et al. ........ | 252/299.5 |
| 5,506,704 A | * | 4/1996 | Broer et al. .................... | 349/98 |
| 5,624,974 A | * | 4/1997 | Onishi et al. .................... | 522/96 |
| 5,679,414 A | * | 10/1997 | Akashi et al. ................ | 428/1.53 |
| 5,945,203 A | * | 8/1999 | Soane ........................... | 428/209 |
| 6,074,708 A | * | 6/2000 | Onishi et al. ................... | 428/1.1 |
| 6,177,968 B1 | * | 1/2001 | Okada et al. .................... | 349/38 |
| 6,818,152 B2 | * | 11/2004 | Penterman et al. ...... | 252/299.01 |
| 2005/0119403 A1 | * | 6/2005 | St. Clair ........................ | 524/736 |
| 2006/0182401 A1 | * | 8/2006 | Risser et al. .................. | 385/129 |
| 2006/0187385 A1 | * | 8/2006 | Liao et al. ..................... | 349/114 |
| 2007/0178662 A1 | * | 8/2007 | Chen et al. .................... | 438/424 |
| 2008/0084522 A1 | * | 4/2008 | Lee et al. ......................... | 349/88 |
| 2008/0113877 A1 | * | 5/2008 | Li .................................. | 506/20 |
| 2008/0255307 A1 | * | 10/2008 | Olson et al. ................... | 525/123 |

OTHER PUBLICATIONS

Penterman. Photo-enforced stratification of liquid crystal/monomer mixtures: Principle, theory, and analysis of a paintable LCD concept. Technische Universiteit Eindhoven (The Netherlands)). 2005 , pp. 1-164. Retrieved from URL<http://search.proquest.com/docview/305382015?accountid=14753. (305382015)> retrieved on Apr. 5, 2013.*

Serbutoviez et al. Polymerization-Induced Phase Separation. 2. Morphology of Polymer-Dispersed Liquid Crystal Thin Films. Macromolecules, 1996, 29 (24), pp. 7690-7698.*

* cited by examiner

*Primary Examiner* — Sanza McClendon
(74) *Attorney, Agent, or Firm* — Klintworth & Rozenblat IP LLC

(57) ABSTRACT

The invention provides a process for manufacturing a polymeric material having a compositional gradient, comprising: forming a mixture comprising a first photopolymerizable polymer precursor and a second photopolymerizable precursor, and subjecting said mixture to an intensity gradient of electromagnetic radiation, wherein said first precursor has a greater reactivity ratio than said second precursor, and/or said first precursor is mono-functional and said second precursor is di-functional, and/or said first precursor is less inhibited by oxygen than said second precursor.

18 Claims, 18 Drawing Sheets

Methyl Methacrylate a, a-Dimethoxy-a-Phenylacetophenone 2-(Dimethylamino)ethyl Acrylate 2-(Dimethylamino)ethyl Methacrylate 2-Hydroxyethyl Acrylate 2-Hydroxyethyl Methacrylate Dipheny(2,4,6-Trimethylbenzoyl)-Phosphine Oxide

PHOTO-ENFORCED STRATIFICATION OF POLYMERIC MATERIALS

CROSS REFERENCES TO RELATED APPLICATIONS

The Present Application claims the benefit of U.S. Provisional Patent Application No. 61/322,034, filed Apr. 8, 2010. The content of this U.S. Provisional Patent Application is hereby incorporated herein in its entirety.

BACKGROUND

Thin films are thin material layers ranging from fraction of a nanometer to multiple micrometers in thickness. Thin films are found, for example, in floor coatings, CD/DVD coatings, pressure sensitive adhesives, dental fillings, curable inks, fiber optic coatings, and contact lenses. Electronic semiconductor devices and optical coatings, for example antireflective (AR) coatings, are primary commercial applications benefiting from thin film construction, and future applications, such as thin-film batteries and computer memories are envisioned.

For many applications, such as thin film coatings, semiconductors, adhesives, biomaterials, and hydrogel systems, it is advantageous to produce a non-homogeneous film, for instance a film that has different surface and substrate interface chemistries. For example, the performance of optical coatings is typically enhanced when the thin film coating includes multiple layers having varying thicknesses and refractive indices. Similarly, a periodic structure of alternating thin films of different materials can collectively form a "superlattice" which exploits the phenomenon of quantum confinement by restricting electronic phenomena to two-dimensions.

Unfortunately, conventional methods produce a layer of thin film coating that is itself homogeneous. Accordingly, conventional methods to create non-homogeneous films include casting multiple layers or using solvent evaporation to achieve desired surface and substrate interface chemistries. While such methods can yield desired properties, they are time-consuming and may result in delamination of the product film. Thus, there remains a need for more efficient processes for producing stratified polymeric materials.

SUMMARY

The present invention relates to a faster, single-step photo-enforced polymer stratification process. In one aspect, the invention relates to a process for producing a polymeric material having a compositional gradient whereby a mixture of polymer precursors is exposed to an electromagnetic radiation intensity gradient.

In a first aspect, the invention provides a process for manufacturing a polymeric material having a compositional gradient comprising: forming a mixture comprising a first photopolymerizable polymer precursor and a second photopolymerizable precursor, and subjecting said mixture to an intensity gradient of electromagnetic radiation. Said first polymerizable precursor has a greater reactivity ratio than said second polymerizable precursor, and/or said first precursor is mono-functional and said second precursor is di-functional, and/or said first precursor is less inhibited by oxygen than said second precursor.

In a second aspect, the invention provides a polymeric material comprising a compositional gradient of first monomers and a compositional gradient of second monomers.

DEFINITIONS

Figure 1:
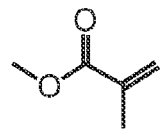
FIG. 1 illustrates the chemical structures of polymer precursors utilized in Example 1, i.e. methyl methacrylate (MMA), 2,2-dimethoxy-2-phenylacetophenone (DMPA, also known as α,α-dimethoxy-α-phenylacetophenone), 2-(dimethylamino)ethyl acrylate (DMAEA), 2-(dimethylamino)ethyl methacrylate (DMAEMA), 2-hydroxyethyl acetate (HEA), 2-hydroxyethyl methacrylate (HEMA), and diphenyl(2,4,6-trimethylbenzoyl)-phosphine oxide (TPO).
Figure 1:
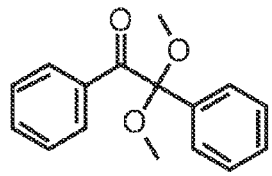
Figure 1:
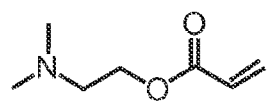
Figure 1:
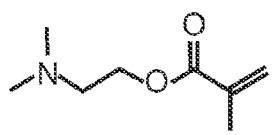
Figure 1:
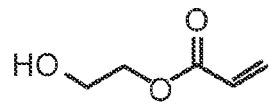
Figure 1:
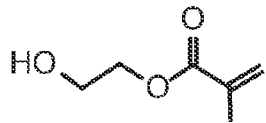
Figure 1:
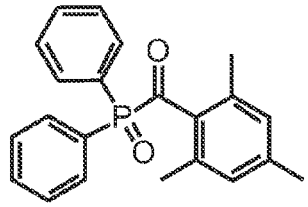

A polymer precursor is a compound that will form a polymer, for example when it comes into contact with a polymerization activator suitable to the polymer precursor. Classes of polymer precursors include acrylates, methacrylates, and vinyl compounds such as styrene; precursors of monomers of multi-monomer polymers such as thiols, alcohols and amines; and prepolymers such as oligomers still capable of further polymerization.

An activator is anything that when contacted or mixed with a reaction mixture can form a polymer. Example activators include catalysts, initiators, and native activating moieties. A corresponding activator for a polymer precursor is an activator that when contacted or mixed with that specific polymer precursor will form a polymer.

A catalyst is a compound or moiety that will cause a reaction mixture to polymerize, and is not always consumed each time it causes polymerization. This is in contrast to initiators and native activating moieties.

An initiator is a compound that will cause a reaction mixture to polymerize, and is usually consumed at the time it causes polymerization.

A photoinitiator is a type of initiator which absorbs electromagnetic radiation, usually UV or visible, and will cause a reaction mixture to polymerize, usually by giving rise to free radicals and/or cations. Based on the mechanism by which radicals are formed, photoinitiators are usually divided into two classes: Type I photoinitiators undergo a unimolecular bond cleavage upon irradiation to yield free radicals. Type II photoinitiators undergo a bimolecular reaction where the excited state of the photoinitiator interacts with a second molecule (also known as "coinitiator"), for example in a hydrogen abstraction reaction, to generate free radicals.

A compound is a molecule that contains at most 100 repeating units. This is in contrast to a polymer, which contains more than 100 repeating units.

A polymeric material is a material comprising one or more polymers.

A monomer is a repeating unit in a polymer. A monomer may be labeled according to the polymer precursor it is derived from. For example, by "monomer A" is meant a monomer derived from polymer precursor A.

A "growing polymer" or "growing polymer chain" is a molecule that: (1) contains more than one monomer, and (2) comprises a reactive moiety that can react with a polymer precursor to form another growing polymer. A growing polymer can be characterized by the reactive moiety it comprises. For example, a "growing polymer ending with A" is a growing polymer wherein "A" is the reactive moiety. In the case of a radical polymerization reaction, a growing polymer ending with A can be represented as "R-A.," where A. is a radical moiety covalently bound to R. R represents the remaining part of the growing polymer, for example a moiety of formula H-(A)$_n$-, "n" being a natural number larger than 1.

A "compositional gradient" as used herein means that the concentration of a monomer of a polymeric material is higher in a first point of the material than the concentration of the same monomer in a second point of the material.

A mono-functional polymer precursor is a precursor having one reactive moiety available for forming chemical bonds within a polymer, for example one carbon-to-carbon double bond.

A di-functional polymer precursor is a precursor having two reactive moieties for forming chemical bonds within a polymer, for example two carbon-to-carbon double bonds.

A crosslinking reagent is a compound having two or more reactive moieties, where each moiety can react with a functional group of a polymer precursor or polymer.

Electromagnetic radiation includes photons of all frequencies, including but not limited to ultraviolet (UV) light, visible light, infrared (IR) light, and microwaves.

As used herein, a "system" is a mixture comprising at least two polymer precursors, where the precursors are preferably but not necessarily in a 1:1 molar ratio. For example, the "1:1 A:B system" is a mixture comprising equal moles of polymer precursors A and B. A system can be prepared in different formulations, where each formulation, for example, contains an amount of photoinitiator different than the others.

As used herein the term "reactivity ratio" is defined as follows: given a first polymer precursor A and a second polymer precursor B, the reactivity ratio of A is defined as the ratio $k_{AA}:k_{AB}$, where $k_{AA}$ is the reactivity constant of the reaction between a growing polymer ending with A and polymer precursor A, and $k_{AB}$ is the reactivity constant of the reaction between the growing polymer ending with A and polymer precursor B. Similarly, the reactivity ratio of B is defined as $k_{BB}:k_{BA}$, where $k_{BB}$ is the reactivity constant of the reaction between a growing polymer ending with B and polymer precursor B, and $k_{BA}$ is the reactivity constant of the reaction between the growing polymer ending with B and polymer precursor B.

DETAILED DESCRIPTION

The present invention relates to improved processes for forming a polymeric material having a compositional gradient, and to materials and products formed therefrom.

In one embodiment, the present invention provides photo-enforced stratification methods that induce compositional gradients in polymeric materials by applying light intensity gradients to reaction mixtures comprising at least a first and a second polymer precursor, wherein the first polymer precursor has a higher reactivity ratio that the second polymer precursor. The photo-induced polymerization rate is dependent on the light intensity. Thus, the polymerization rate will be higher where the light intensity is higher which provides a basis to induce a compositional gradient. For example, if the light intensity is higher at the surface of the reaction mixture, the first precursor will be incorporated to a greater extent than the second into the polymer(s) forming at the surface, thereby generating a compositionally-stratified polymeric material.

In this aspect of the invention, the process results in a decreased local concentration of the first precursor at the surface and induces diffusion of more first precursor from the bulk of the reaction mixture to the surface. Concurrently, counter-diffusion carries the second precursor from the surface to the bulk mixture. Upon completion of the polymerization reaction, the final product polymeric material is enriched with monomers derived from the first precursor on the surface, and a gradient with increased concentrations of monomers derived from the second precursor will be established through the material.

The photo-enforced stratification process of the present invention provides a faster, single-step replacement to conventional multistep processes to achieve a compositional gradient in a polymeric material. The invention is therefore of value in applications where the surface and/or substrate interface chemistry of a material or article of manufacture should differ from that of the bulk, for example in thin films, semiconductors, optical coatings, batteries, computer memories, adhesives, antimicrobials, dentistry fillings, and biomaterials.

The methods of the invention are not limited to any particular source or frequency of electromagnetic radiation. Example sources include visible, ultraviolet (UV), and infrared (IR) lights, LEDs, lasers, and microwave-emitting devices. Preferred frequencies include those of the ultraviolet (UV), visible, infrared (IR), and microwave spectra. Particularly preferred are visible and UV light.

In one aspect, the present invention relates to exposing a reaction mixture to an electromagnetic radiation intensity gradient. The radiation intensity gradient can be generated, for example by including a chromophore in the reaction mixture. Suitable chromophores include, but are not limited to, photoinitiators, dyes, and radiation-absorbing moieties of polymer precursors. Due to absorption of electromagnetic radiation by the chromophore, an intensity gradient will be established in the mixture, with higher intensities in the parts of the mixtures in closer proximity to the radiation source. The amount of chromophore required to obtain a desired gradient can be established, for example, by preparing a calibration curve relating the concentration of chromophore to the transmittance of the reaction mixture at specific wavelengths. Additional ways of creating electromagnetic radiation intensity gradient include applying masks of suitable absorbance to one or more parts of the reaction mixture and/or establishing patterns of electromagnetic radiation interference within the reaction mixture.

Polymer precursors can be monofunctional or multifunctional. Preferred monofunctional precursors include acrylates such as acrylic acid, hydroxyethyl acrylate, isodecyl acrylate, and 2-(dimethylamino)ethyl acrylate (DMAEA); methacrylates such as methacrylic acid, methyl methacrylic acid, 2-hydroxyethyl methacrylate (HEMA), hydroxypropyl methacrylate, and 2-(dimethylamino)ethyl methacrylate (DMAEMA); nitriles of acrylates such as acrylonitrile; amides of acrylates such as acrylamide; vinyl compounds such as styrene, alpha-methylstyrene, 4-vinylphenol, 3-vinylbenzaldehyde, vinyl halides, vinyl ethers, vinyl esters, 9-vinylcarbazole, N-vinyl pyrrolidone and vinyl phosphoric acid; propenyl ethers; unsaturated polyesters; unsaturated hydrocarbons; lactones; thiols; alcohols; amines; epoxides; oxetanes; and cyclic ethers.

Preferred multifunctional precursors include trimethylolpropane triacrylate (TMPTA), ethoxylated TMPTA, trimethylolpropane trimethacrylate, tripropylene glycol diacrylate (TRPGDA), poly(ethylene glycol)diacrylates (PEGDA) and hexanediol diacrylate. Other precursors include oligomers such as epoxy acrylates, urethane acrylates, polyester acrylates, acrylated acrylics, epoxy resins, cycloaliphatic epoxides, silicones, and unsaturated polyesters.

Particularly preferred polymer precursors include methyl methacrylate (MMA), 2-(dimethylamino)ethyl methacrylate (DMAEMA), 2-(dimethylamino)ethyl acrylate (DMAEA), 2-hydroxyethyl acetate (HEA), 2-hydroxyethyl methacrylate (HEMA), 1,6-hexanediol diacrylate (HDDA), 1,6-hexanediol dimethacrylate (HDDMA), and 2-Methoxyethyl acrylate (MOA).

The choice of a polymerization activator will be influenced by the chemistry of the reaction mixture and the desired product. Preferred activators include Type I and Type II photoinitiators. Preferably, the absorbance of the initiator overlaps the frequency or frequencies of the electromagnetic radiation inducing the photopolymerization reaction. Example radical photoinitiators include 2,2-dimethoxy-2-phenylacetophenone (DMPA), benzoin methyl ether, diethoxyacetophenone, 1-hydroxycyclohexyl phenyl ketone, benzoylphosphine oxides, 2-Hydroxy-2-methyl-1-phenyl-propan-1-one (commercially available as Darocur® 1173) and 1-[4-(2-Hydroxyethoxy)-phenyl]-2-hydroxy-2-methyl-1-propane-1-one (commercially available as Irgacure® 2959). Example cationic photoinitiators include triarylsulfonium salts, diaryliodonium salts, ferrocenium salts, diazonium salts, and dialkylphenylacylsulphonium salts. Example Type II photoinitiators include methylene blue (MB) and titanocenes.

Additionally, one or more solvents and a number of additives can be included in the reaction mixture. One class of additives is represented by crosslinking reagents that can be added to crosslink the polymer(s) of the product. Example crosslinking reagents include divinyl benzene (DVB), poly(ethylene glycol)di(meth)acrylate, poly(propylene glycol)di(meth)acrylate, poly(ethylene glycolranpropylene glycol)di(meth)acrylate, poly(propylene glycol)blockpolycaprolactone di(meth)acrylate, poly(ethylene glycol)blockpolytetrahydrofuran di(meth)acrylate, glycerolethoxylatedi(meth)acrylate, and glycerol ethoxylate di(meth)acrylate.

The invention has been described with reference to various illustrative embodiments and techniques. However, it should be understood that many variations and modifications as are known in the art may be made while remaining within the scope of the claimed invention. The examples that follow are illustrative and are not intended to be limiting.

Example 1

Photo-Enforced Stratification

Figure 5:
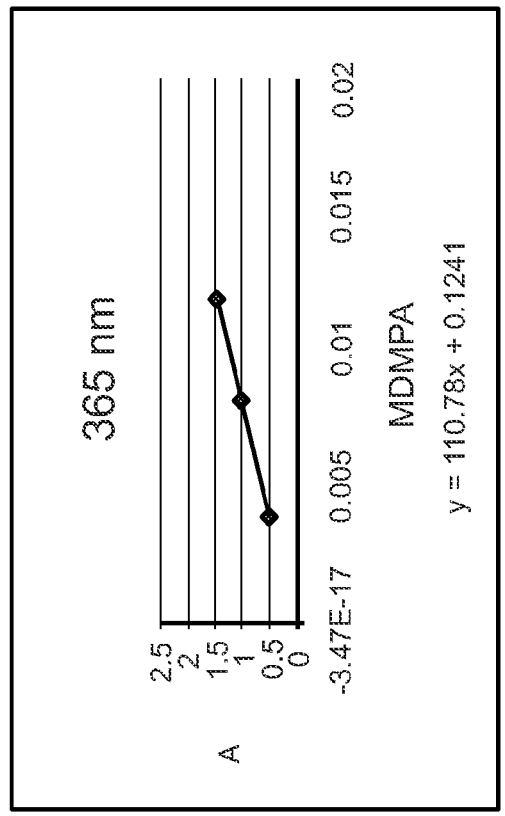
FIG. 5 illustrates calibration curves relating the concentration of photoinitiator DMPA to absorbance. The equations for the calibration lines are shown at the bottom of the graphs.
Figure 5:
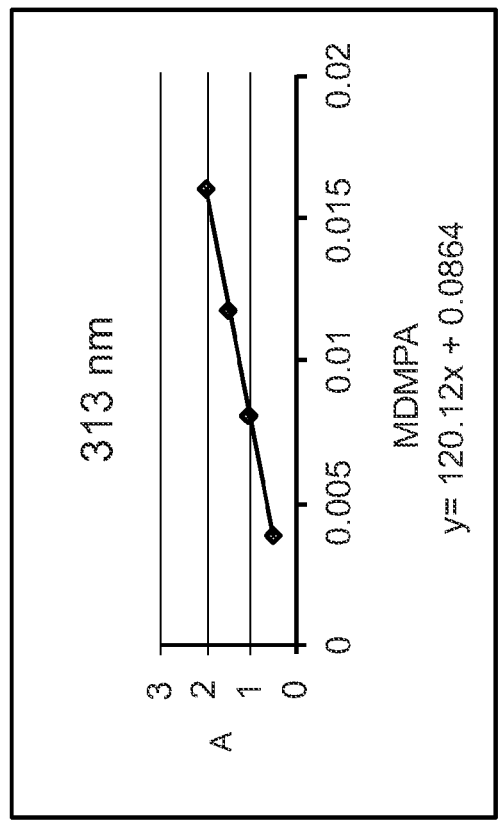

As an example of the methods of the invention, an acrylate, methyl acrylate, and a methacrylate, methyl methacrylate, were co-polymerized in the presence of an UV light intensity gradient to form a thin film. The light gradient was established through the reaction mixture by adding an appropriate concentration of photoinitiator DMPA. The determination of the DMPA concentration necessary to achieve a light gradient in which 50% of the light is transmitted to the bottom side of the film was determined using UV-Visible measurements. By varying the concentration of the photoinitiator and recording the absorbance at 313 nm and 365 nm wavelengths, a calibration curve was derived (FIG. 5). Using the calibration curve and the Beer-Lambert Law, the amount of photoinitiator required to have 50% transmittance in a 0.007 inch thin film was calculated to be approximately 4 wt % (Table 1).

TABLE 1

| Wavelength (nm) | Film Thickness (inches) | PI wt % |
| --- | --- | --- |
| 313 | 0.007 | 3.58 |
| 365 | 0.007 | 3.88 |

Whereas neat acrylate systems exhibit faster polymerization rates than methacrylates, for copolymerization of methyl acrylate and methyl methacrylate, the methacrylate reacts faster, as indicated by the reactivity rates of Table 2. Without being bound to any particular theory, it is believed that the methacrylate forms a more stable intermediate radical species than the acrylate, thereby inducing preferential reaction of the methacrylate. In other words, the methacrylate is said to have a higher reactivity ratio than acrylate.

TABLE 2

| Precursor 1 | Precursor 2 | $r_1$ | $r_2$ |
| --- | --- | --- | --- |
| methyl acrylate | methyl methacrylate | 0.4 | 2.2 |

$k_{11}$=kinetic constant for the reaction between growing polymer chain ending in precursor 1 and precursor 1
$k_{22}$=kinetic constant for the reaction between growing polymer chain ending in precursor 2 and precursor 2
$k_{12}$=kinetic constant for the reaction between growing polymer chain ending in precursor 1 and precursor 2
$k_{21}$=kinetic constant for the reaction between growing polymer chain ending in precursor 2 and precursor 1
$r_1=k_{11}/k_{12}$
$r_2=k_{22}/k_{21}$ To evaluate the efficacy of photo-enforced stratification, surface composition analysis was utilized. Spectroscopic analysis allows differentiation and quantification of specific chemical moieties to determine if certain species are enriched on the surface in comparison to conventional materials. Both X-ray photoelectron spectroscopy (XPS), and infra-red spectroscopy were used to show photo-enforced stratification.

XPS is an analytical technique in which the surface of a sample is illuminated with x-rays which results in the ejection of a photoelectron from the core electrons of atoms. The kinetic energy of the photoelectron is indicative of a particular atom, thereby allowing determination of the composition of a film surface.

For this study, sample films were prepared from a reaction mixture containing a 1:1 molar ratio of methyl methacrylate (MMA) to 2-(dimethylamino)ethyl acrylate (DMAEA), and varying concentrations of the photoinitiator 2,2-dimethoxy-2-phenylacetophenone (DMPA) (see FIG. 1 for the respective chemical structures of the compounds). A control film was obtained from a reaction mixture containing 0.1 wt % of the photoinitiator, a concentration too low to induce a sufficient light gradient. To induce a sufficient light gradient to allow for photo-enforced stratification, a sample film was obtained from a reaction mixture including 4 wt % photoinitiator.

Figure 2:
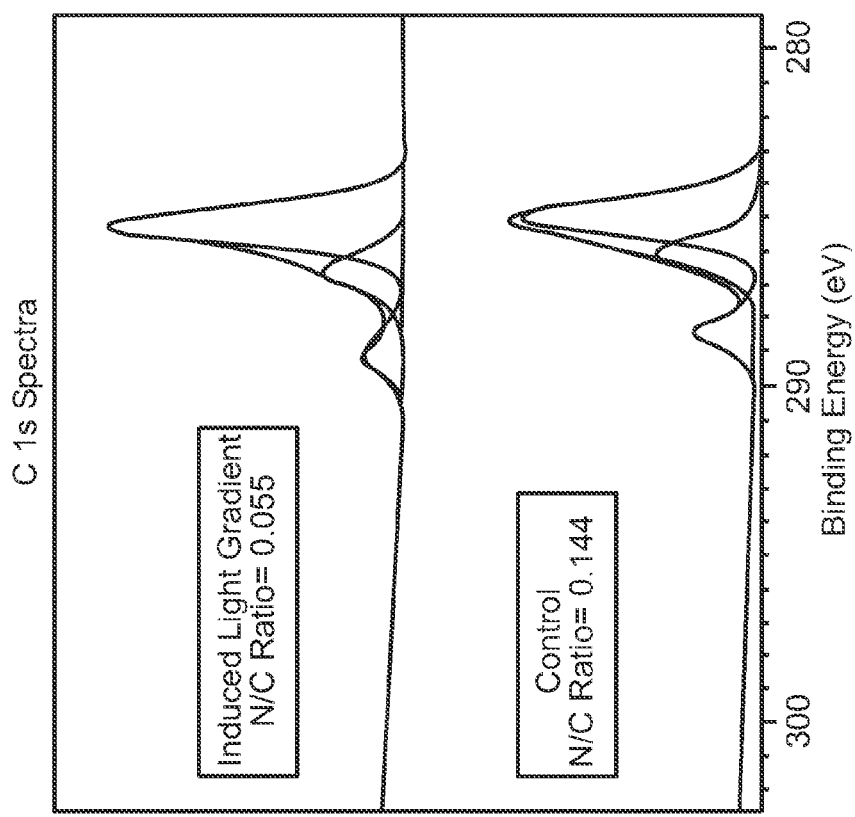
FIG. 2 illustrates nitrogen and carbon XPS spectra of polymers obtained from reaction mixtures containing a 1:1 molar ratio of methyl methacrylate to 2-(methylamino)ethyl acrylate.
Figure 2:
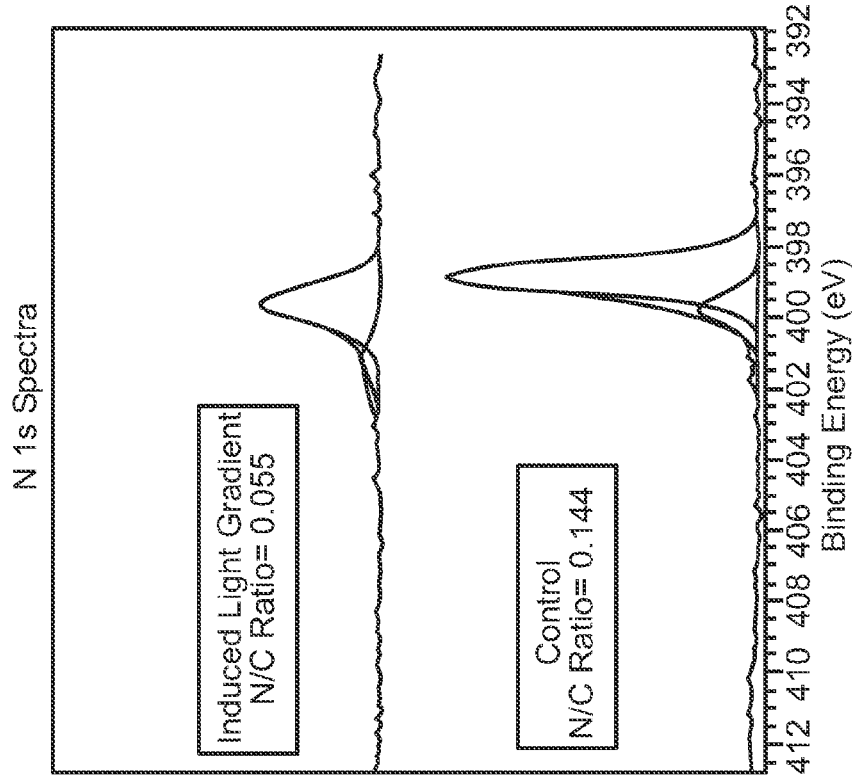

A comparison of the XPS spectra shows that the surface of the sample film exhibited a significant decrease in the intensity and area of the peak in the nitrogen spectrum (FIG. 2). The top spectra were generated from the sample film, while the bottom spectra were from the control film. The ratio of nitrogen to carbon was reduced by over 60% for the sample film. Since only the monomer derived from DMAEA ("the acrylate monomer") contained nitrogen, the change in the amount of nitrogen at the surface could be equated to a change of the acrylate monomer at the surface. The XPS spectra therefore show that the concentration of the acrylate monomers was not uniform, and that this was due to the presence of the light gradient during photopolymerization. This resulted in an enrichment of the monomers derived from MMA ("the methacrylate monomers") at the surface, demonstrating that photo-enforced stratification has occurred.

To obtain a greater understanding of photo-enforced stratification, two model systems were designed and studied such that the individual monomers could be tracked based on the different functional groups present in the molecule. A first formulation ("the 1:1 DMAEA:HEMA system") included polymeric material samples obtained from a mixture having a 1:1 molar ratio of 2-(dimethylamino)ethyl acrylate (DMAEA) and 2-hydroxyethyl methacrylate (HEMA). A second formulation ("the 1:1 DMAEMA:HEA system") included polymeric material samples obtained from a mixture having a 1:1 molar ratio of 2-(dimethylamino)ethyl methacrylate (DMAEMA) and 2-hydroxyethyl acetate (HEA). Varying concentrations of DMPA were used as the photoinitiator for the polymerization of the mixtures. These systems allowed for the location of DMAEA and DMAEMA to be tracked by following the location of nitrogen, and the location of HEMA and HEA to be tracked by following the location of the hydroxyl group.

A relatively simple and quick test to determine monomer location is attenuated total reflectance infrared spectroscopy (ATR). ATR is based on the principle of internal reflectance. The ATR crystal has a high index of refraction, so when infrared (IR) light is passed through the crystal at an angle greater than the critical angle (when measured with respect to the normal) the light is internally reflected. However, at the "bounce points" a small evanescent wave is sent outside of the crystal and then back into the crystal. By placing a sample in close contact with the crystal it is therefore possible to obtain a near surface IR vibrational spectrum of the sample by means of Fourier transform infrared spectroscopy (FTIR).

By comparing the relative abundance of the monomers at the near surface region with the relative abundance of the monomers found in the bulk of the sample by transmission IR spectroscopy, the relative enrichment in monomers, and thus, the degree of photo-enforced stratification can be determined. The relative concentration of nitrogen to hydroxyl containing monomers is calculated from the absorbance values corresponding to the C—N and O—H stretch at wavelengths of approximately 1150 $cm^{-1}$ and 3380 $cm^{-1}$, respectively.

Figure 3:
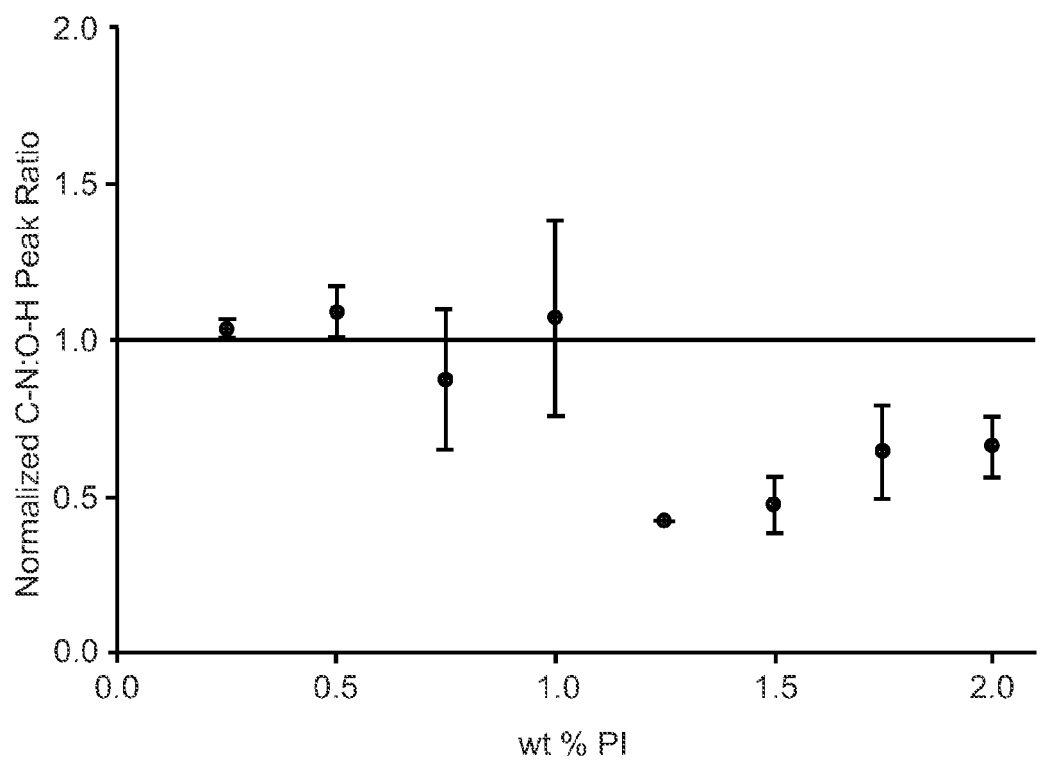
FIG. 3 illustrates the normalized ratio of C—N to O—H absorbance for polymers derived from mixtures containing a 1:1 molar ratio of DMAEA to HEMA and increasing concentrations of DMPA photo-initiator.

FIG. 3 shows the ratio of the C—N peak absorbance to that of the hydroxyl group in the one to one DMAEA:HEMA system polymerized with DMPA. The ratio is normalized to that observed via transmission IR spectroscopy in the bulk for a homogeneous sample (solid line). This ratio can thereby determine if the surface chemistry varies from that of the bulk. At concentrations of photoinitiator of 1 wt % or less, the peak ratio at the surface of the samples is approximately equal to that of the bulk and thus photo-enforced stratification does not appear to be prevalent. However, with concentrations of photoinitiator greater than 1 wt %, the ratio of C—N to hydroxyl at the surface is substantially less than the bulk ratio, thus implying that the monomer derived from hydroxyl methacrylate is enriched at the surface as would be expected in the event of photo-enforced stratification.

In order to further illustrate that the precursor functionality and accompanying reactivity ratios drive the photo-enforced stratification, as opposed to other driving forces such as surface energy, the methacrylate and acrylate functionalities were switched using the same basic precursor chemistries as above. If photo-enforced stratification is driving the changes, the methacrylate monomer, now containing the C—N bond instead of the hydroxyl group, would still preferentially segregate at the surface.

Figure 4:
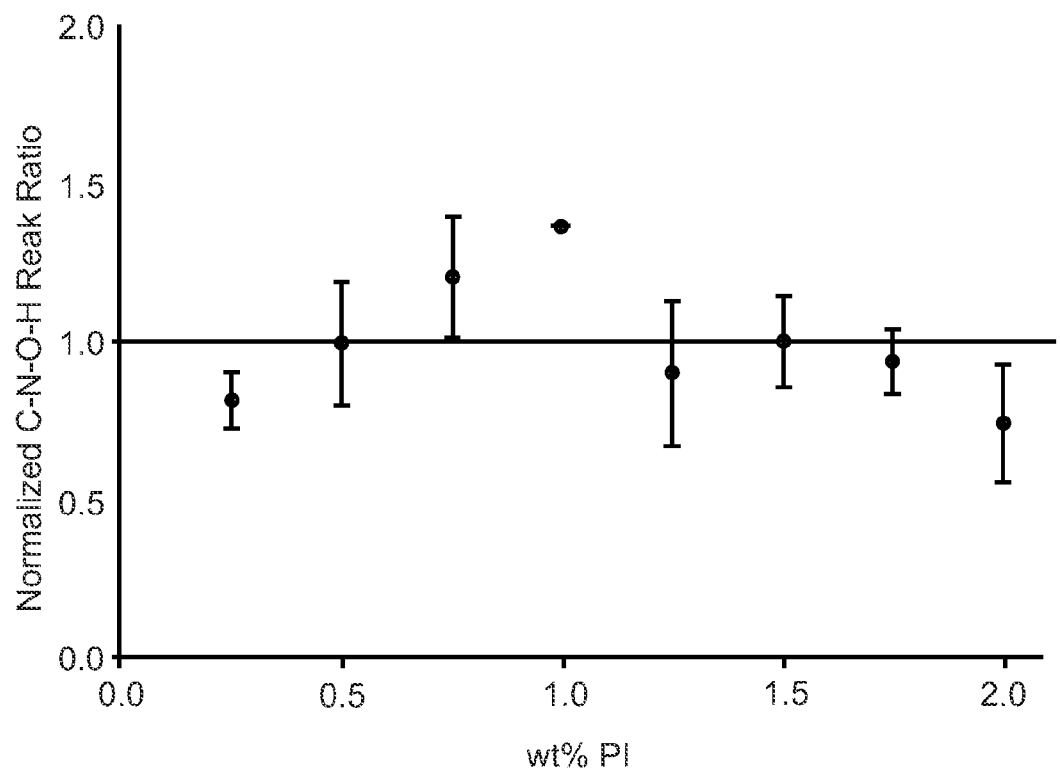
FIG. 4 illustrates the normalized ratio of C—N to O—H absorbance for polymers derived from mixtures containing a 1:1 molar ratio of DMAEMA to HEA and increasing concentrations of DMPA photo-initiator.

FIG. 4 shows the ratio of the C—N peak absorbance to that of the hydroxyl group in the one to one DMAEMA:HEA system polymerized with DMPA. The ratio is normalized to that observed via transmission IR spectroscopy in the bulk for a homogeneous sample (solid line). As the concentration of photoinitiator is increased to 0.5 wt %, the ratio at the surface is approximately equal to bulk, which is as would be expected in a homogeneous system. Once the concentration of photoinitiator is increased to 0.75 wt % and 1 wt %, the surface ratio is significantly higher than the bulk ratio, implying that the nitrogen containing methacrylate is now enriched at the surface.

At photoinitiator concentrations greater than 1 wt % the surface ratio is again approximately equal to the bulk ratio, indicating that photo-enforced stratification is no longer being achieved. Accordingly, the DMAEMA:HEA system appears to allow photo-enforced stratification only over intermediate concentration ranges. These results imply that other factors also are significant in allowing the stratification to take place, but that the process is driven primarily by the reactivity ratios.

Figure 6:
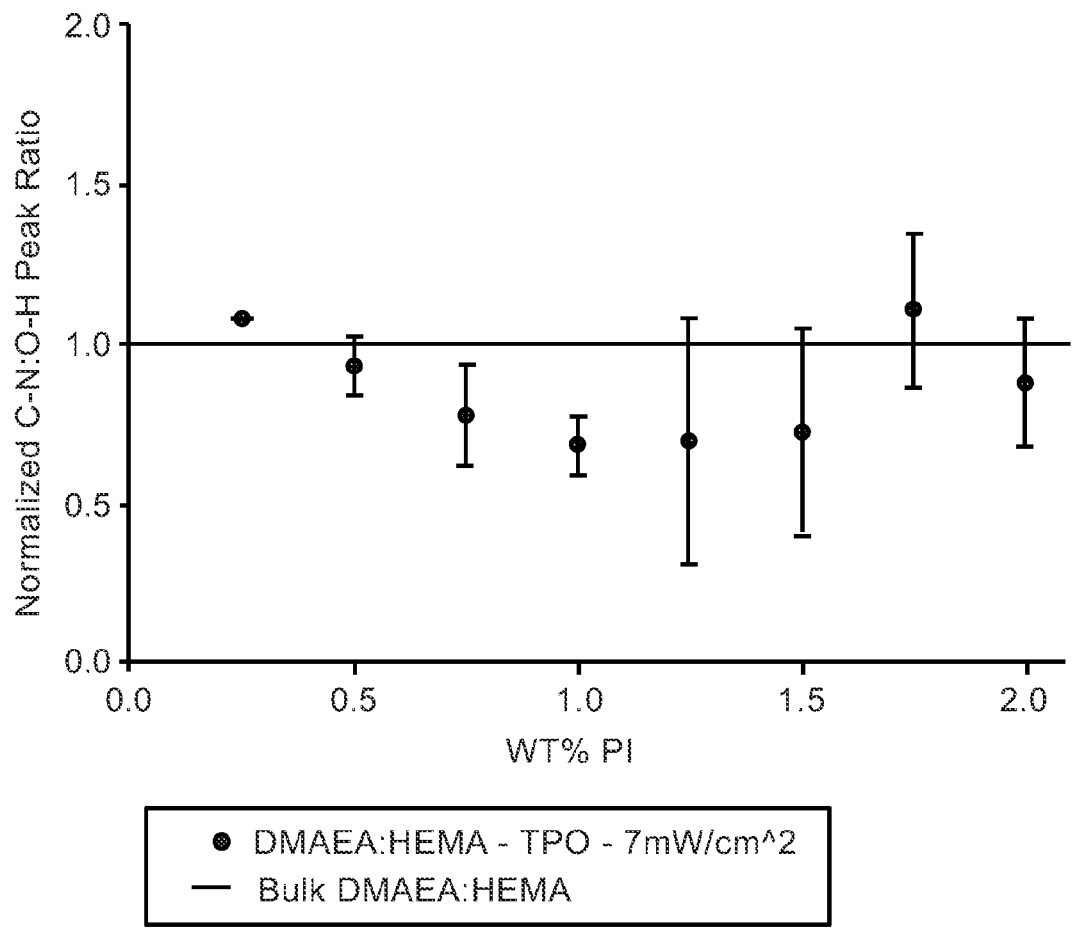
FIG. 6 illustrates the normalized ratio of C—N to O—H absorbance for polymers derived from mixtures containing a 1:1 molar ratio of DMAEA to HEMA and increasing concentrations of TPO photoinitiator.

FIG. 6 shows the ratio of the C—N peak absorbance to that of the hydroxyl group in the one-to-one DMAEMA:HEA system polymerized with TPO. The ratio is normalized to that observed via transmission IR spectroscopy in the bulk for a homogeneous sample (solid line). For photoinitiator concentrations equal and less than 0.5%, the surface ratio is approximately equal to the bulk ratio as expected in homogenous systems. Once the concentration of photoinitiator reaches 0.75% through 1.5% the surface ratio is significantly less than the bulk ratio, implying that the hydroxyl containing methacrylate is now enriched at the surface.

At photoinitiator concentrations greater than 1.5% the surface ratio is again approximately equal to the bulk ratio, indicating that photo-enforced stratification is no longer being achieved. Accordingly, the DMAEA:HEMA system polymerized with TPO appears to allow photo-enforced stratification only over intermediate concentration ranges.

Figure 7:
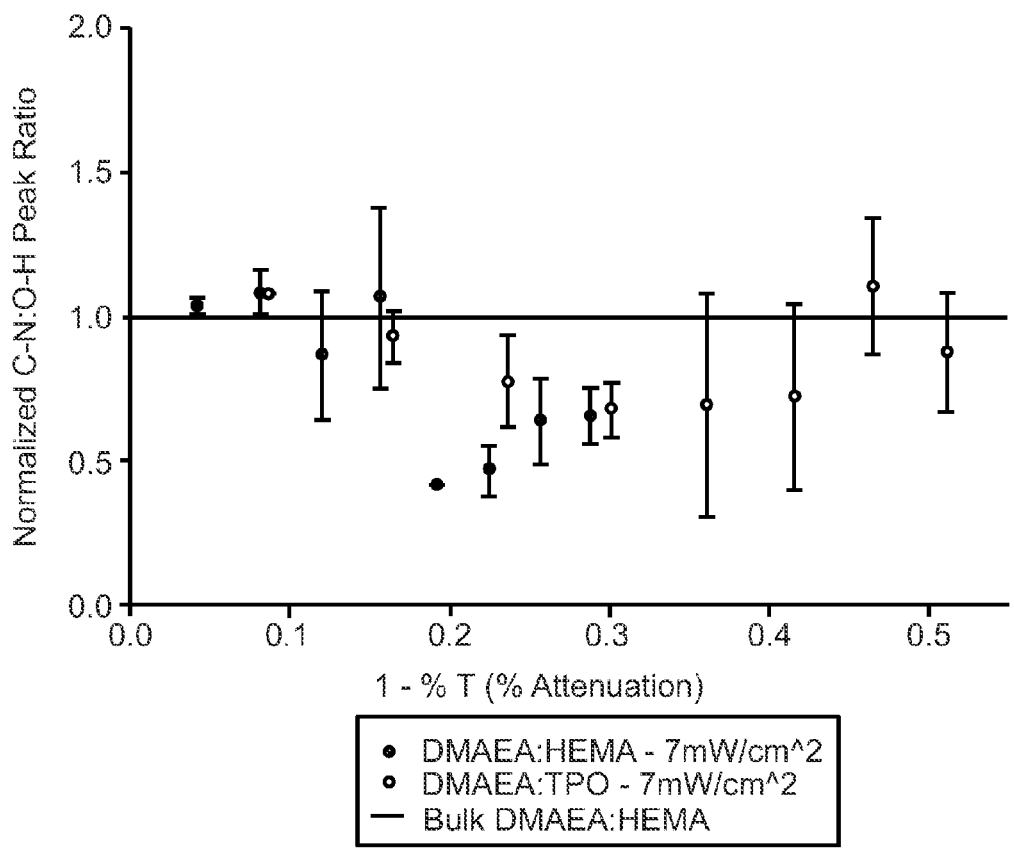
FIG. 7 illustrates the normalized ratio of C—N to O—H absorbance for polymers derived from mixtures containing a 1:1 molar ratio of DMAEA to HEMA and increasing concentrations of DMPA and TPO photo-initiator. Concentration of photoinitiator has been graphed as one minus the fractional transmittance via Beer's Law.

FIG. 7 illustrates a comparison between the one to one DMAEA:HEMA system polymerized with DMPA and TPO. When the concentration of photoinitiator is converted to one minus the fractional transmittance using Beer's Law and literature molecular absorbance values at 365 nm, the systems show approximately identical behavior, especially in the onset of photo-enforced stratification indicating that for the DMAEA:HEMA system there is a threshold of light attenuation that will allow for photo-enforced stratification and one that stops photo-enforced stratification.

Example 2

Mono-Functional Vs. Di-Functional Polymer Precursors

Figure 8:
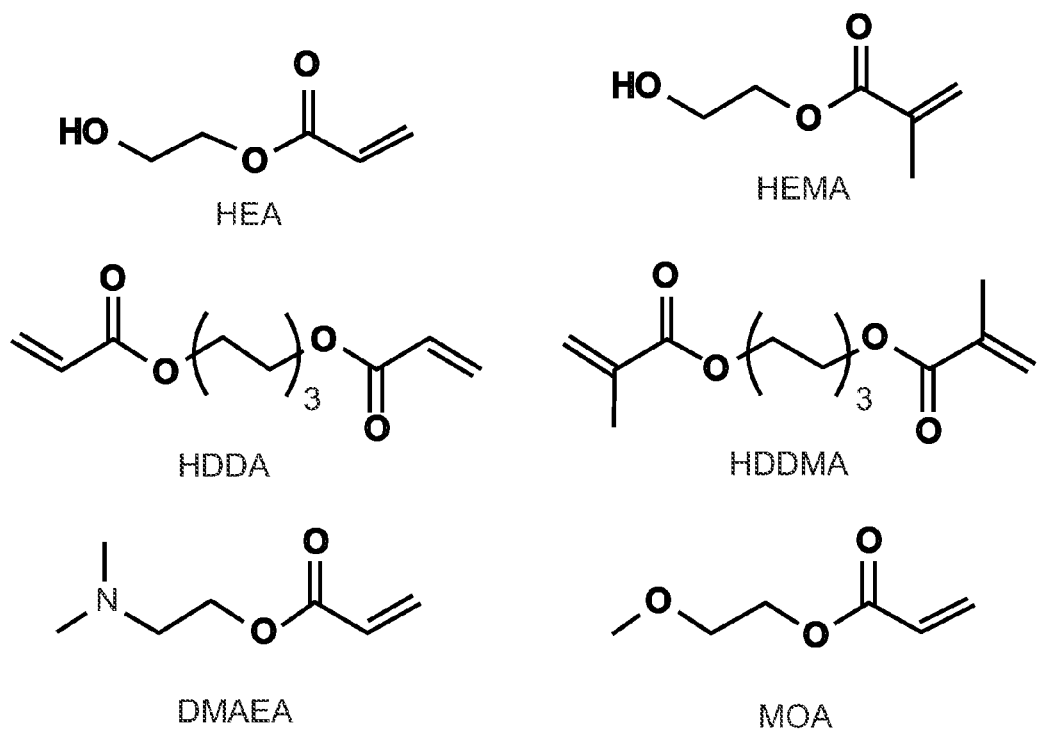
FIG. 8 illustrates the chemical structures of polymer precursors utilized in Examples 2-5, i.e. 2-hydroxyethyl acrylate (HEA), 2-hydroxyethyl methacrylate (HEMA), 1,6-hexanediol diacrylate (HDDA), and 1,6-hexanediol dimethacrylate (HDDMA), 2-(Dimethylamino)ethyl acrylate (DMAEA), and 2-Methoxyethyl acrylate (MOA).

The polymer precursors used in Examples 2-5 were 2-hydroxyethyl acrylate (HEA), 2-hydroxyethyl methacrylate (HEMA), 1,6-hexanediol diacrylate (HDDA), 1,6-hexanediol dimethacrylate (HDDMA), 2-Methoxyethyl acrylate (MOA), and 2-(Dimethylamino)ethyl acrylate (DMAEA) (see FIG. 8 for chemical structures). Unless specified otherwise, the precursors were mixed in 1:1 molar ratio systems. The photoinitiator used was α,α-dimethoxy-α-phenylacetophenone (DMPA) for Type I initiation and methylene blue (MB) for Type II initiation.

In Examples 2, 4 and 5, films were polymerized between two glass slides with a silicon release film used for systems which did not contain a diene monomer and cut glass slides as spacers. This resulted in films with a thickness of approximately one millimeter. Polymerization occurring between two glass slides resulted in the differences between the composition at the top of films and that at the bottom being strictly derived from photo-enforced stratification, and not due to interactions with the substrate.

The films of Examples 2-5 were analyzed by means attenuated total reflectance (ATR) infrared Fourier transform spectroscopy. The respective compositions of the top and bottom of the film were quantified by taking the "ratio composition," i.e. the ratio of the height of the peak corresponding to the hydroxyl group, which was present in only one of the monomers of a film, to the peak height of the carbonyl group, which was located on all monomers present in the film.

Mono-Methacrylate with Di-Methacrylate

Figure 9:
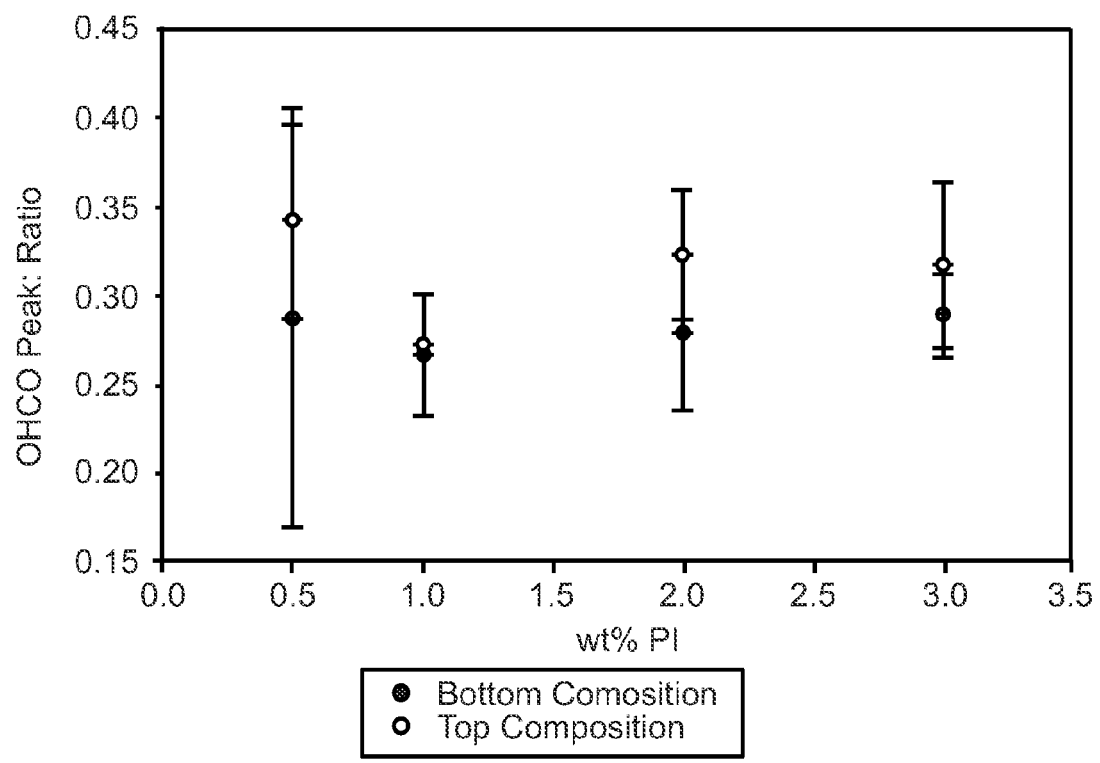
FIG. 9 illustrates calculated peak ratio of various 1:1 HEMA to HDDMA systems when polymerized using 7 mW/cm$^2$ light. The top and bottom compositions are approximately equal, showing that photo-enforced stratification does not occur.

A mixture containing a 1:1 molar ratio of 2-hydroxyethyl methacrylate (HEMA) and 1,6-hexanediol dimethacrylate (HDDMA) ("the HEMA:HDDMA system") was produced with various amounts of DMPA photoinitiator. Without being bound to any particular theory, di-functional HDDMA was expected to react faster than mono-functional HEMA. As such, HDDMA should be found enriched at the surface of the film if photo-enforced stratification took place. When the film was polymerized with 7 mW/cm$^2$ light there was little to no photo-enforced stratification evident irrespective of the amount of photoinitiator. As illustrated in FIG. 9, the composition ratio of the top and the bottom of the product films were not statistically different throughout the range of photoinitiator contents tested.

Figure 10:
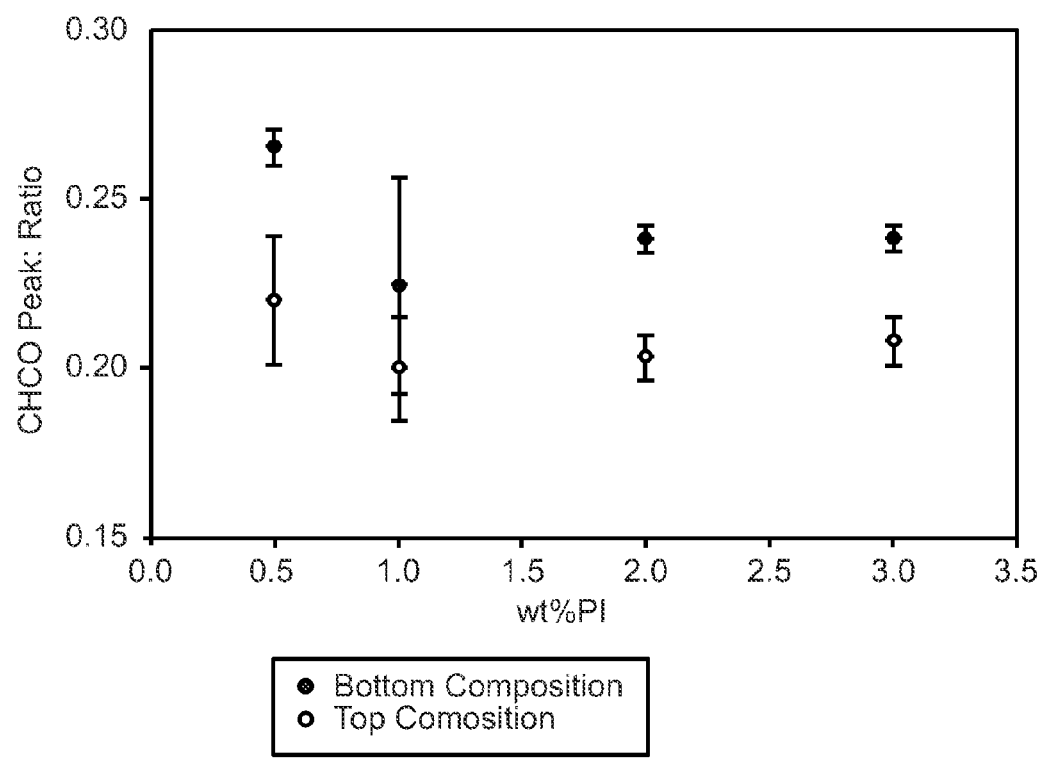
FIG. 10 illustrates calculated peak ratios of various 1:1 HEMA to HDDMA systems polymerized using 1.4 mW/cm$^2$ light. The top and bottom compositions differed at all photoinitiator compositions, except for the 1% by weight (wt %) photoinitiator formulation, showing that photo-enforced stratification had occurred with enrichment of HDDMA at the surface.

In order to test if this system would undergo photo-enforced stratification, the rate of polymerization was reduced by decreasing the light intensity to 1.4 mW/cm$^2$, which was expected to decrease the rate of polymerization to approximately half of that obtained when using 7 mW/cm$^2$ light (FIG. 10). This decrease in the rate of polymerization was expected to allow for a longer time for diffusion and, perhaps, for photo-enforced stratification. Indeed, photo-enforced stratification was observed at almost all photoinitiator concentrations, with the exception of the 1 wt % photoinitiator formulation. Since the hydroxyl moiety is present only on the monomer derived from HEMA and the top ratio composition was lower than the bottom ratio composition, photo-enforced stratification resulted in an enrichment of HDDMA at the surface.

This behavior illustrates that it is possible to observe photo-enforced stratification in cross-linked systems with sufficiently slow rates of polymerization. Additionally, the inherent differences in the reaction rates of mono-functional monomers and di-functional monomers are sufficient to allow for photo-enforced stratification to occur and lead to an enrichment of the di-functional monomer at the surface.

Mono-Acrylate with Di-Methacrylate

Mixtures of a 1:1 molar ratio of 2-hydroxyethyl acrylate (HEA) and 1,6-hexanediol dimethacrylate (HDDMA) ("the HEA:HDDMA system") were tested with various amounts of DMPA photoinitiator. If photo-enforced stratification occurred, the HDDMA should be enriched at the surface due to both (1) the methacrylate moiety having a higher reactivity ratio than the acrylate and (2) the higher reactivity of difunctional polymer precursors as opposed to mono-functional ones. When the mixtures were polymerized with 7 mW/cm² light, some photo-enforced stratification appeared to occur (FIG. 11) although the magnitude of the error bar does make the level of stratification more difficult to determine.

Figure 12:
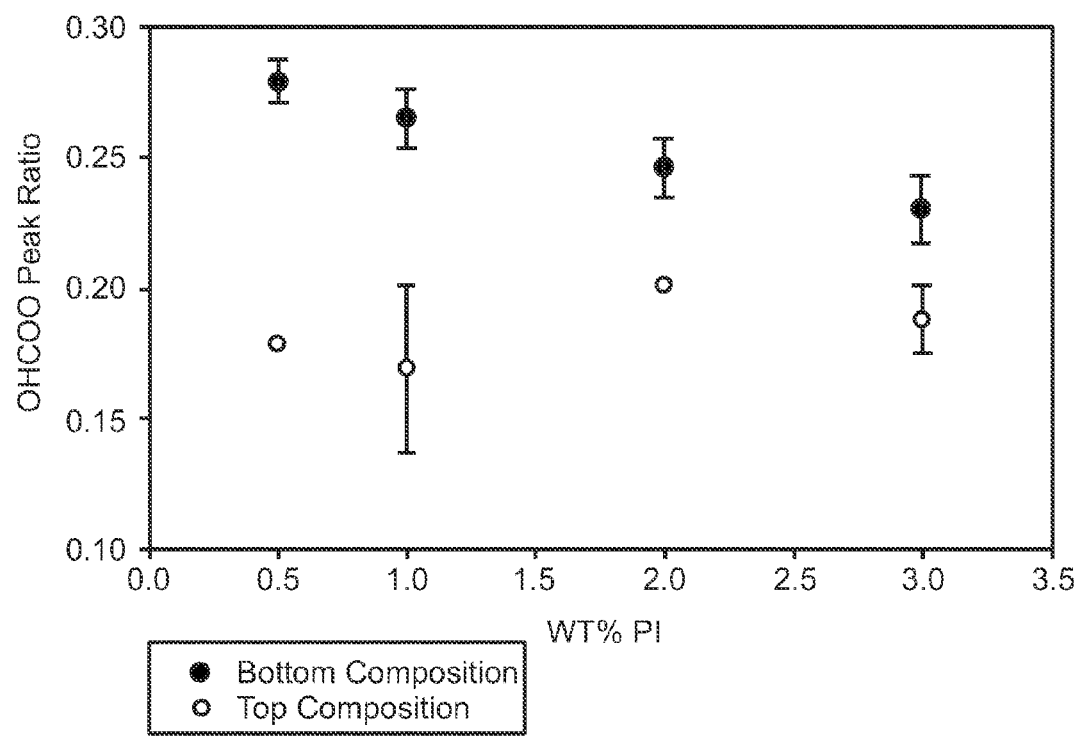
FIG. 12 illustrates calculated peak ratios of various 1:1 HEA to HDDMA systems when polymerized using 1.4 mW/cm$^2$ light. The top and bottom compositions differ at all photoinitiator concentrations, showing that photo-enforced stratification has occurred with HDDMA being substantially enriched at the top surface.

The mixtures were then polymerized with a light intensity of 1.4 mW/cm² in order to decrease the rate of reaction to about half of the rate obtained with 7 mW/cm², thereby allowing for a longer monomer diffusion time. With this lower polymerization rate, photo-enforced stratification did occur at all concentrations of photoinitiator tested (FIG. 12) and to a much greater degree than observed at higher light intensities.

There was a substantial difference between the composition at the top of the film and that at the bottom, a fact proving that photo-enforced stratification had occurred. Since the hydroxyl group is a moiety of the monomer derived from HEA and the composition ratio at the top was lower than that at the bottom, photo-enforced stratification again resulted in an enrichment of HDDMA at the surface by as much as 40%. Without being bound to any particular theory, it is believed that the combination of a di-functional monomer bearing an inherently faster reacting moiety will result in even greater enrichment at the surface. Interestingly, the stratification did not appear to decrease in degree with higher amounts of photoinitiator, although higher concentrations of photoinitiator would be expected to lead to more light attenuation and faster polymerization rates.

Mono-Methacrylate with Di-Acrylate

Formulations of a 1:1 molar ratio of 2-hydroxyethyl methacrylate (HEMA) and 1,6-hexanediol diacrylate (HDDA) ("the HEMA:HDDA system") with varying concentrations of DMPA photoinitiator were also produced. For this system it was harder to predict which monomer would be enriched at the surface if photo-enforced stratification occurred. On the one hand, HEMA has a methacrylate reactive functional group, meaning that it is expected to have a higher reactivity ratio in the copolymerization, a feature which could lead to HEMA enrichment at the surface of the polymeric thin film. On the other hand, HDDA has two acrylate moieties, which was shown in the HEMA:HDDMA system to be a sufficient driving force to induce photo-enforced stratification. Therefore, for this system either monomer could reasonably segregate to the surface.

Figure 13:
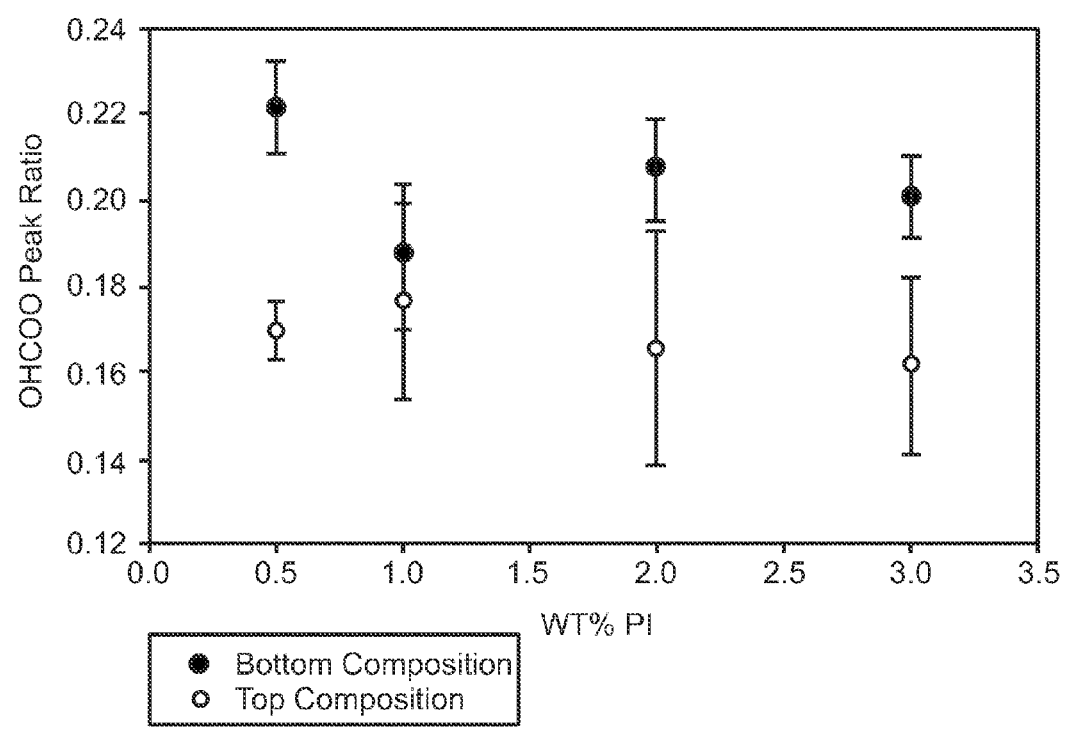
FIG. 13 illustrates calculated peak ratios of various 1:1 HEMA to HDDA systems polymerized with 7 mW/cm$^2$ light.
Figure 14:
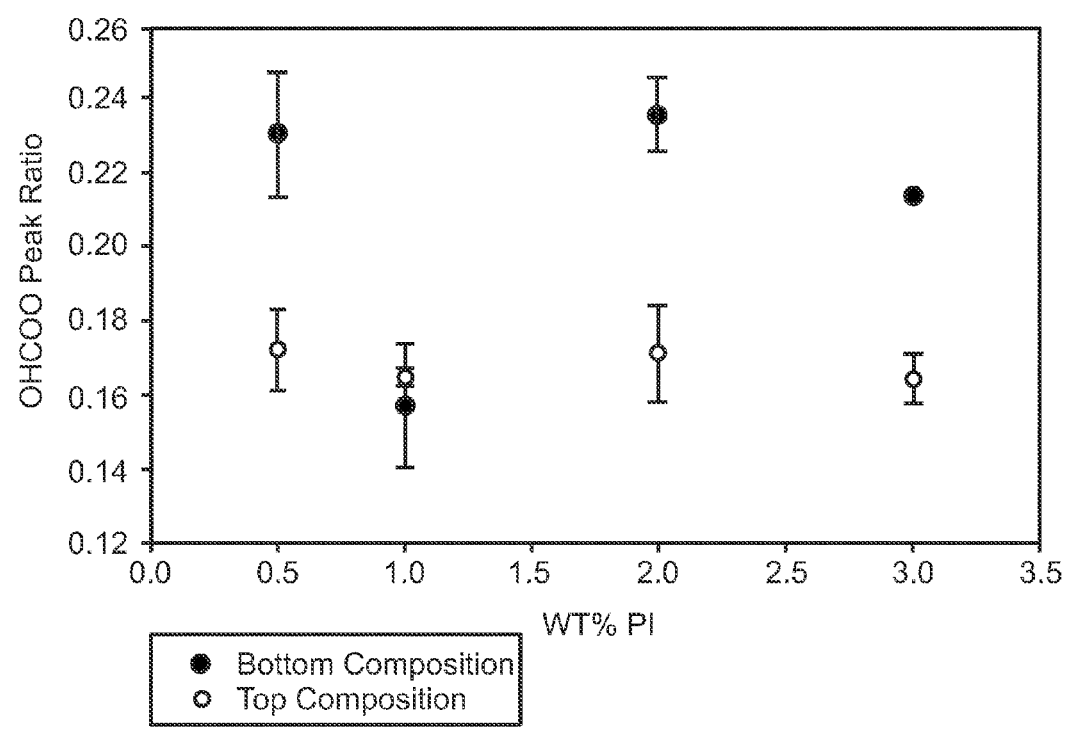
FIG. 14 illustrates calculated peak ratios of various 1:1 HEMA to HDDA systems polymerized with 1.4 mW/cm$^2$ light. The top and bottom composition differ at all almost photoinitiator compositions, showing that photo-enforced stratification has occurred.

When the HEMA:HDDA mixture was polymerized with a light intensity of 7 mW/cm², some differences in composition were observed with the top surface of the product polymer film having lower amounts of hydroxyl groups than its bottom surface at several initiator concentrations (FIG. 13). By decreasing the rate of polymerization through a decrease in light intensity, significantly different compositions between the top and the bottom of the film at almost all concentrations of photoinitiator were observed (FIG. 14). As the hydroxyl moiety is present in the monomer derived from the methacrylate precursor and the ratio measured at the top was less than that at the bottom, photo-enforced stratification resulted in substantial enrichment of HDDA at the top of the product film.

The above results show that the functionality of a polymer precursor is a strong driving force for photo-enforced stratification in addition to its inherent reactivity ratio. Additionally, it is possible to resort to the functionality of the precursor to overcome the driving force due to the reactivity ratio and obtain acrylate enrichment at the surface of the product polymer.

Example 3

Oxygen Inhibition

Radical photopolymerization is inhibited by atmospheric oxygen. Typically this is a problem which leads to incomplete curing of the polymer. In a polymer film, the top 20 microns, approximately, are not cured completely, resulting in a tacky surface while the polymer precursor(s) below this region will react fully to yield a polymer. The thickness of the oxygen-inhibited region is usually dependent on the ability of oxygen to diffuse into the film and the rate that the monomers can react. The location where the rate of oxygen diffusion into the film is matched by the rate of polymerization determines the depth of the oxygen-inhibited layer and, as such, the depth of the oxygen inhibited layer can vary between different formulations.

Many methods exist to overcome or minimize oxygen inhibition, including the use of nitrogen gas blanketing, high initiator concentrations, and high light intensities. Instead of trying to overcome oxygen inhibition, however, it could instead be used as a driving force for photo-enforced stratification. Rather than using a light gradient and segregating polymer precursors based on precursor reactivity, surface monomer enrichment will be accomplished due to one precursor in the copolymerization being less inhibited by oxygen compared to the other. This is not to imply that an oxygen inhibited region will not exist but rather that the less oxygen inhibited precursor reacts to some degree such that the chemical potential changes enough to allow for diffusion of the precursor to the surface, thereby resulting in a counter diffusion of the precursor in the copolymerization.

Films produced for the oxygen inhibition study of Example 3 and those produced using a 1.4 mW/cm² light were polymerized in a mold that was open to the atmosphere. If oxygen inhibition was utilized as a driving force for stratification, then the following procedure was followed: illumination with UV light in a container open to the atmosphere for a duration of ten minutes, shutting off the UV light and purging the container for 15 minutes with nitrogen, and further illumination until the film was fully cured.

Figure 15:
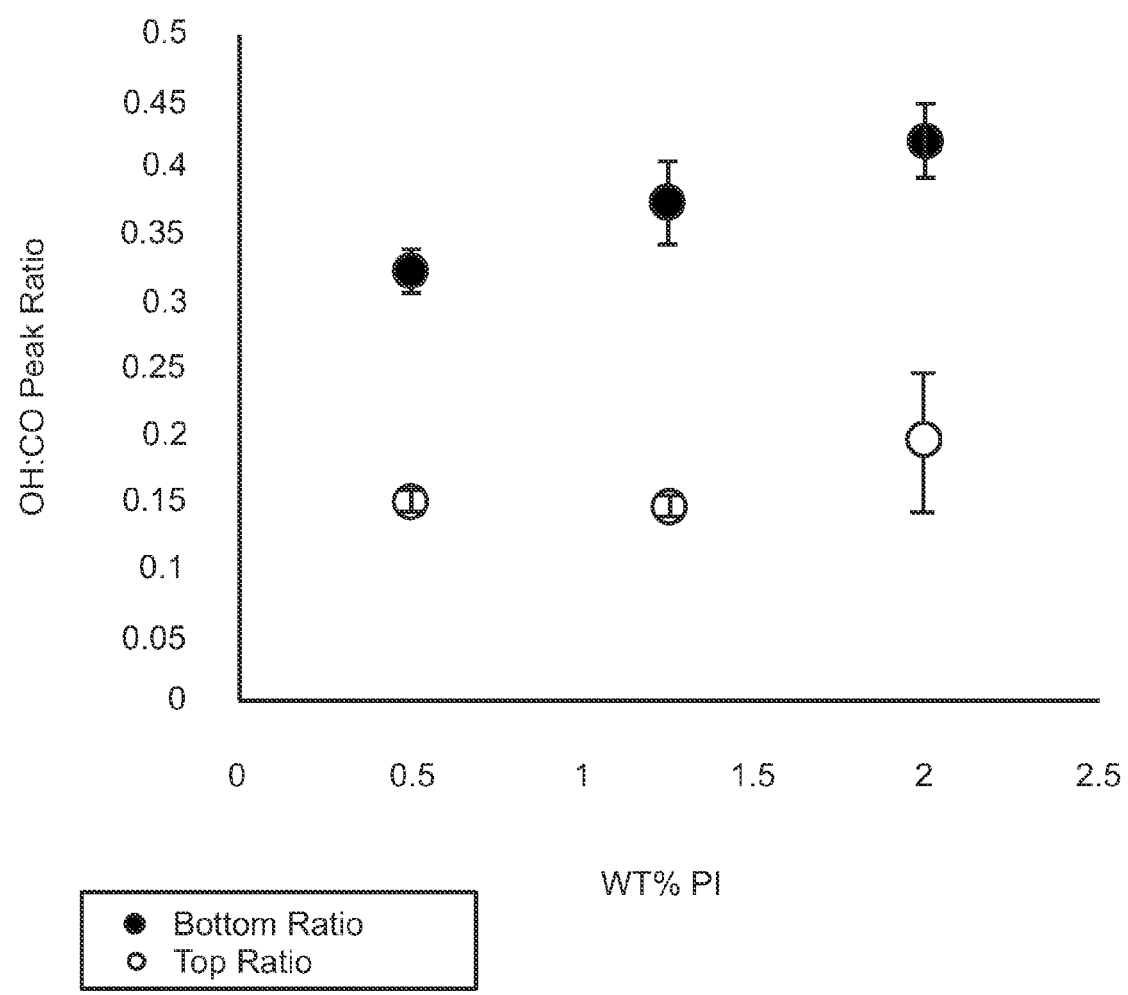
FIG. 15 illustrates calculated peak ratios of a 1:1 MOA:HEMA system polymerized at different photoinitiator concentrations in the presence of oxygen. Large differences between the top and bottom composition is observed at all photoinitiator concentrations, showing that photo-enforced stratification has occurred.

Without being bound to any particular theory, methacrylates are known to be less inhibited by oxygen as compared to acrylates; accordingly, it is assumed that methacrylates will undergo surface enrichment via photo-enforced stratification due to oxygen inhibition. The MOA:HEMA system was used to study oxygen inhibition using varying concentrations of photoinitiator (FIG. 15). Surface enrichment of the monomer derived from HEMA was found at all photoinitiator concentrations. This is in contrast to previous where only intermediate concentrations of photoinitiator resulted in photo-enforced stratification. These results are quite different than those observed when simply using reactivity ratios as the driving force for stratification. In particular, it appears that the amount of surface enrichment and the range of photoinitiator concentrations applicable to the process are much greater when oxygen inhibition is used to facilitate stratification.

The results from this study show that oxygen inhibition can contribute to photo-enforced stratification. Also, the range in the concentration of photoinitiator that will allow for photo-enforced stratification when oxygen inhibition is one of the driving forces for stratification is much larger than when only reactivity ratios are the driving force.

Example 4

Type II Photoinitiation

Type II photoinitiation is a process in which a dye absorbs light and can then undergo hydrogen atom abstraction with another chemical species to create a radical which can initiate polymerization. A tertiary amine is commonly used as a species that allows for a hydrogen abstraction, thus forming the radical species that initiates polymerization. The application of a light gradient induces a "reaction gradient" during formation of a film, i.e. the upper regions of the film polymerize faster due to higher rates of initiation, which in turn causes a change in the chemical potential of the tertiary amine species, thereby bringing about its diffusion to the surface. If the tertiary amine is attached to one of the polymer precursors in a copolymerization reaction, the concentration of the monomer deriving from that precursor would thus be enriched at the surface in the event of photo-enforced stratification.

To test Type II photoinitiation as a driving force for photo-enforced stratification a series of three systems were studied (Table 3). The first system was DMAEA:HEA with methylene blue (MB) as the photoinitiator, so that Type II initiation was the only form of initiation possible. The second system ("1 A") included the same polymer precursors, but DMPA was used as the photoinitiator so that Type II photoinitiation was still possible but not the main method of initiation. The third and final system ("1 B") was MOA:HEA with DMPA as the photoinitiator, so that Type II initiation was not possible.

When Type II photoinitiation was the only initiation mechanism, about 40% enrichment in the monomer derived from DMAEA, i.e. the monomer bearing a tertiary amine moiety, was achieved. If the tertiary amine was not included in the system, then virtually no photo-enforced stratification was observed when polymerizing two acrylates. If Type I photoinitiation was the primary initiation method but Type II photoinitiation was still possible, then a small amount of photo-enforced stratification was observed. Taken together, these results show that Type II photoinitiation can be a strong driving force for photo-enforced stratification and can be used to induce stratification. The use of Type II photoinitiation also shows that gradient films can be produced by inducing polymerizing with visible light and not only with UV light.

TABLE 3

| Initiation Type | Photoinitiator | Monomers | Percent Enrichment |
| --- | --- | --- | --- |
| 2 | MB | DMAEA:HEA | 40 |
| 1 A | DMPA | DMAEA:HEA | 10 |
| 1 B | DMPA | MOA:HEA | 3 |

Example 5

Error Bar Reduction

Figure 11:
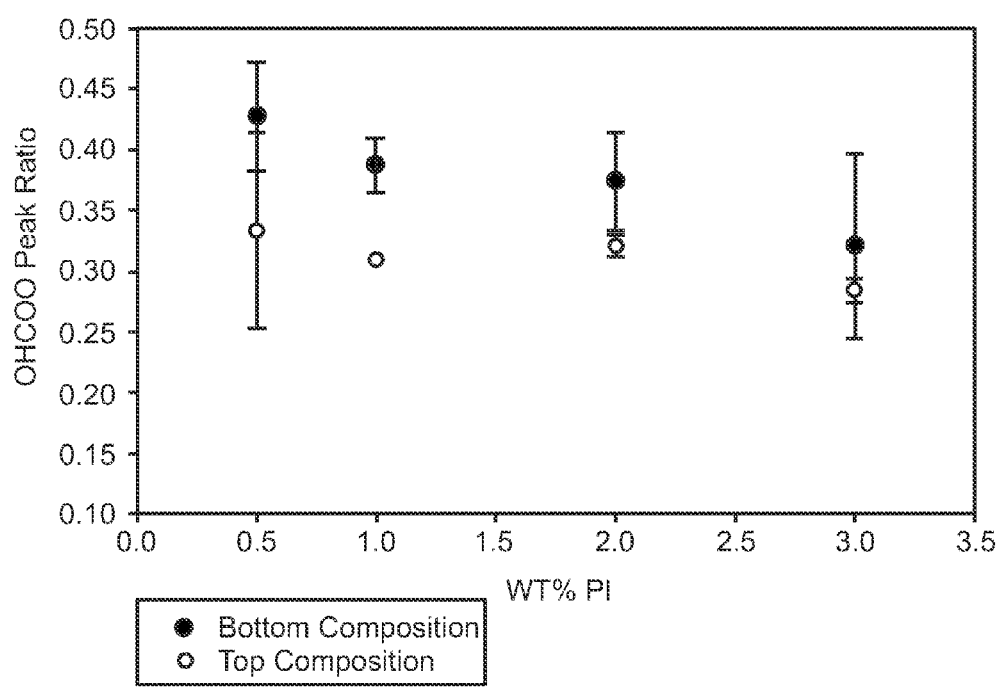
FIG. 11 illustrates calculated peak ratios of various 1:1 HEA to HDDMA systems when polymerized using 7 mW/cm$^2$ light.
Figure 16:
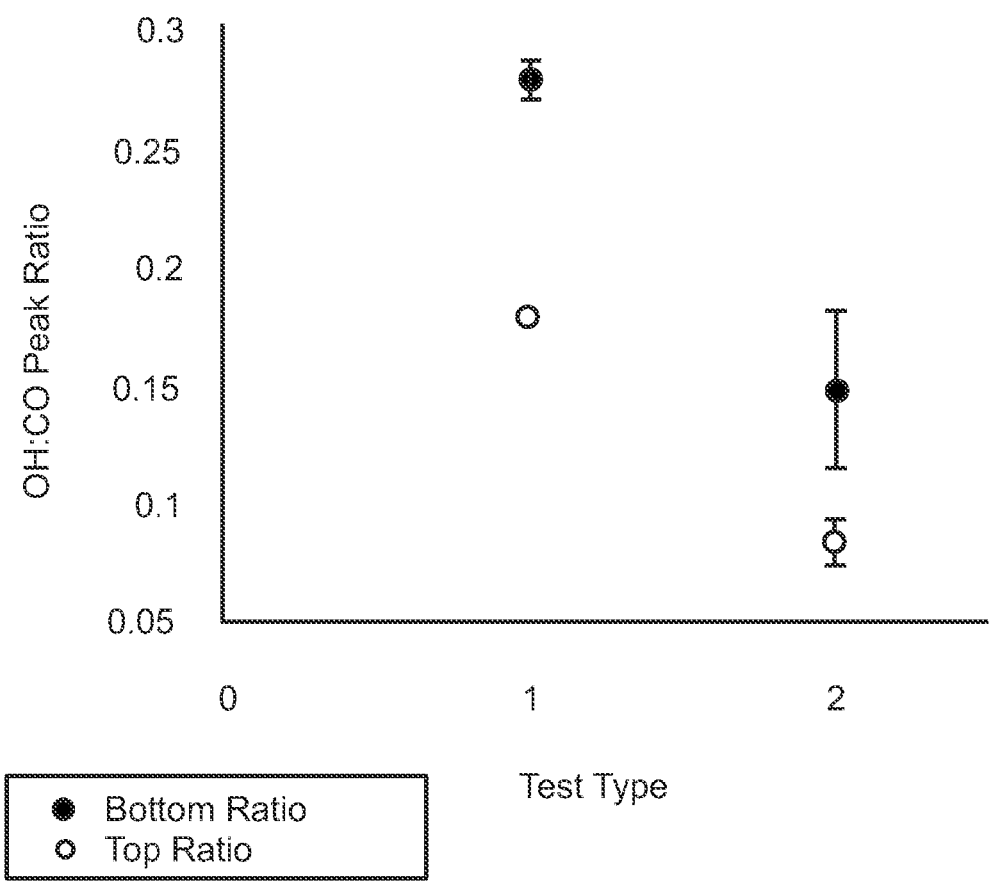
FIG. 16 illustrates a comparison of HEA:HDDMA system polymerized with 0.5 wt % photoinitiator and 1.4 mW/cm$^2$ light. Test type 1 was analyzed with a multiple bounce ATR crystal and type 2 was analyzed with a single bounce ATR crystal. Note the increase in the size of the error bars associated with the single bounce ATR, indicating that incident light intensity is very important in the amount of photo-enforced stratification observed.

A problem encountered with the previous examples is the apparent poor repeatability due to large error bars. It was noticed that in Example 2 the magnitude of the error bars for the polymers polymerized with 1.4 mW/cm$^2$ light (FIGS. 10, 12, and 14) were much lower than for the polymers polymerized with 7 mW/cm$^2$ (FIGS. 9, 11, and 13). The only variation in the process for producing the polymers was in the light intensity and in the orientation of the light source. The light source used for the 7 mW/cm$^2$ light was a point source, whereas the 1.4 mW/cm$^2$ light was emitted by a line source. When using the 1.4 mW/cm$^2$ light source, a much more uniform illumination was observed. Samples polymerized with 1.4 mW/cm$^2$ light were analyzed by means of single bounce ATR and multiple bounce ATR. In single bounce ATR the surface composition was determined at a small point, whereas in multiple bounce ATR the composition was determined across the entire sample (FIG. 16).

The resulting peak ratios between the two ATR methods were different, a fact most likely due to the use of different instruments and crystals, but the analysis of the same set of samples by means of single bounce ATR analysis yielded much larger error bars than in the case of multiple bounce ATR. Even though localized differences in the surface concentration were present, the variations obtained in surface composition are more reproducible with the 1.4 mW/cm$^2$ light than with the 7 mW/cm$^2$ light, thereby resulting in much smaller error bars in the case samples polymerized with 1.4 mW/cm$^2$ light.

Figure 17:
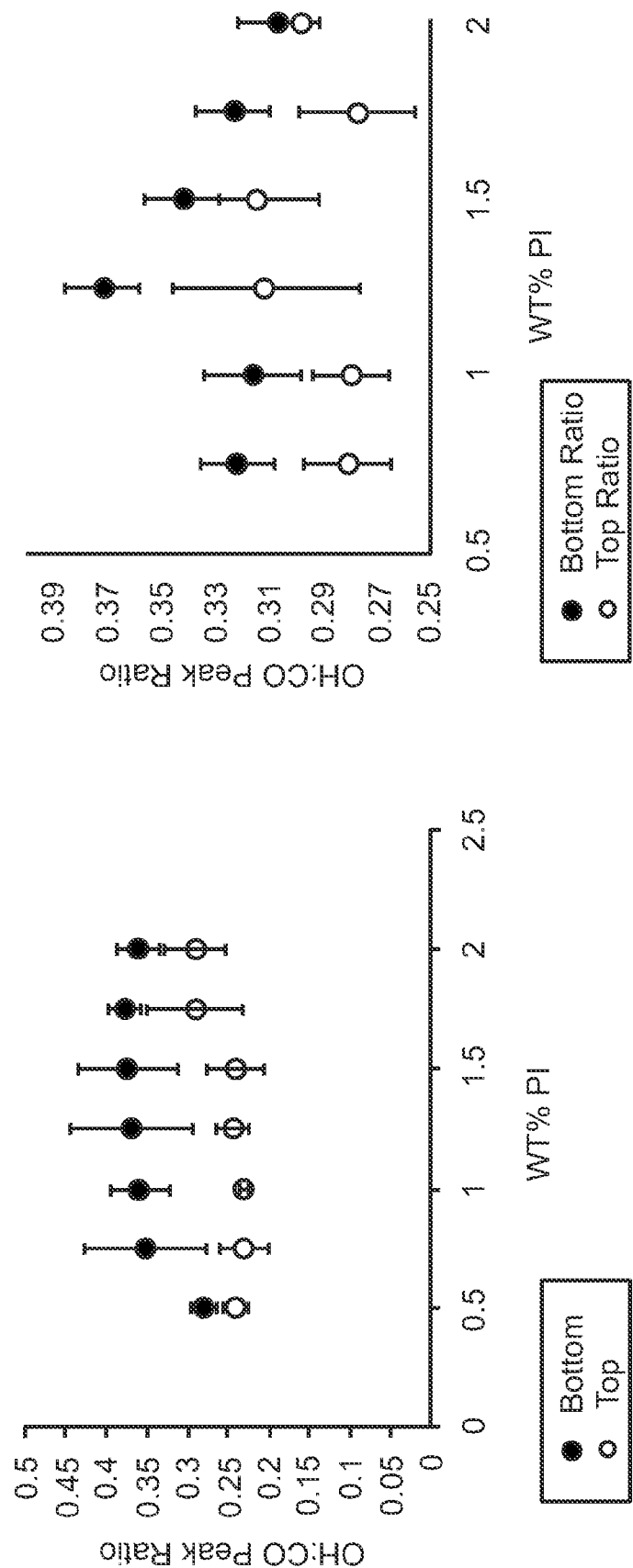
FIG. 17 illustrates a comparison of error bars between two MOA:HEMA systems. The samples analyzed to make the graph on the left were produced using a 7 mW/cm$^2$ point light source. The samples for the graph on the right were produced using a 1.4 mW/cm$^2$ line light source. The error bars associated with the line source are much smaller. Note that the y axis is on a smaller scale on the right graph.

Similar error bar patterns were observed with another system where the 7 mW/cm$^2$ and the 1.4 mW/cm$^2$ light were used to polymerize the samples. The system used to further examine the error bars was a copolymerization of MOA:HEMA mixed on a one to one weight ratio. In previous reports, copolymerization reactivity ratios were shown to be a driving force for photo-enforced stratification. Thus, HEMA was expected to be enriched the surface of the polymer when photo-enforced stratification occurred. The samples were analyzed by ATR to determine the chemical composition at the top and bottom of the product film (FIG. 17).

Both systems exhibited similar behavior but substantially different error bars. At a low weight percent photoinitiator the light attenuation was not high enough for photo-enforced stratification to occur. Adding more photoinitiator allowed for a sufficient light gradient and thus for photo-enforced stratification to occur. Adding yet more photoinitiator caused the polymerization to occur so fast that sufficient diffusion for photo-enforced stratification did not occur, resulting in the amount of monomer enrichment observed at the surface to decrease and even be eliminated. Similar characteristics have been observed in other systems, a fact underscoring the importance of having the correct reaction speed for the system to be able undergo photo-enforced stratification. The error bars were larger for samples polymerized with the 7 mW/cm$^2$ light, again illustrating that the amount of photo-enforced stratification is strongly dependent on the intensity of the light used for polymerization.

Figure 18:
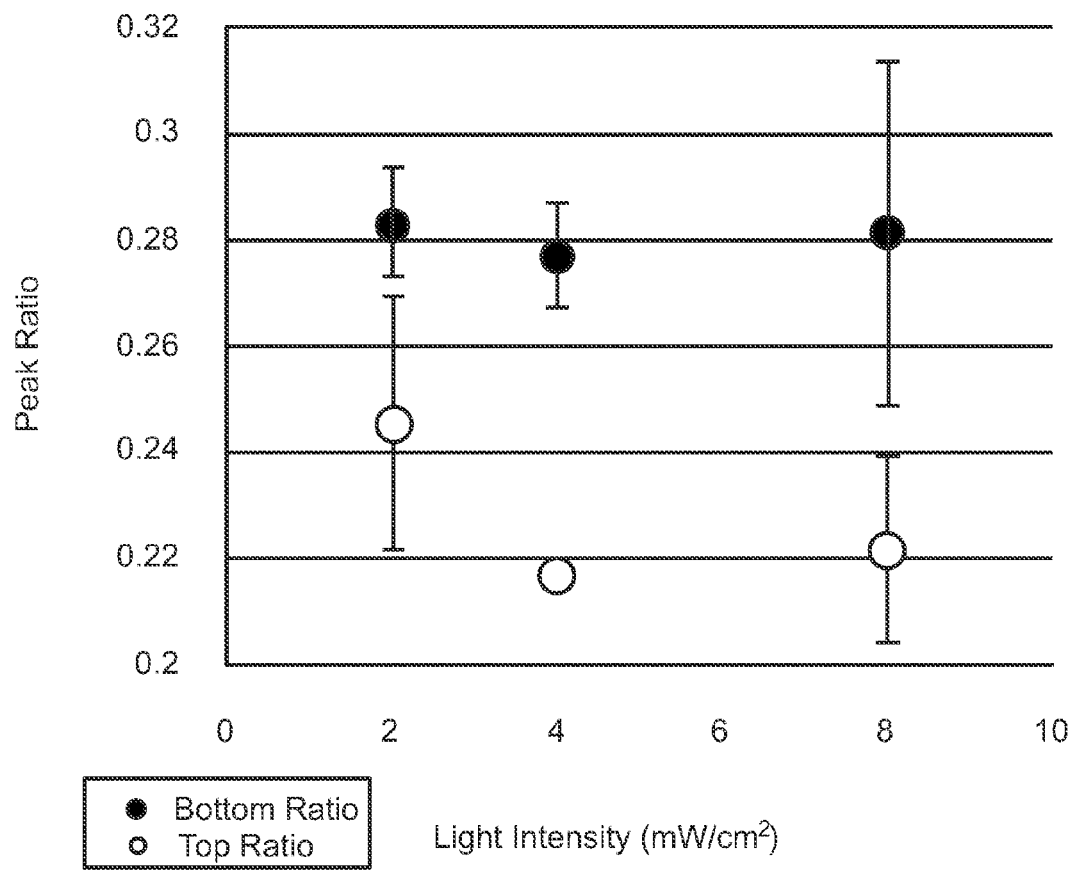
FIG. 18 illustrates a comparison of 1:1 MOA:HEMA systems polymerized with 1.25 wt % photoinitiator at various light intensities and a collimating lens. The error bars are much smaller than in the previous studies.

The previous systems of the present example illustrate that the large error bars are due to variations in light intensity rather than increases in light intensity. To test this hypothesis, the MOA:HEMA system was utilized and samples prepared with a collimating lens at various light intensities (FIG. 18). All samples were prepared using 1.25 wt % DMPA photoinitiator as this concentration showed the largest amount of photo-enforced stratification in with both the 1.4 mW/cm$^2$ and the 7 mW/cm$^2$ lights. Without being bound to any particular theory, the rate of photopolymerization is usually directly dependent on the square root of the incident light intensity. Accordingly, in comparison to a 2 mW/cm$^2$ light, the 4, 8, and 16 mW/cm$^2$ lights should increase the rate of photopolymerization by a factor of 2, 3, and 4, respectively.

The least stratification was observed in samples polymerized with 2 mW/cm$^2$, and the amount of stratification increased with increasing light intensity. Thus, as the incident light intensity increases, so does the relative strength of the reaction gradient, illustrating how important the rate of polymerization is for photo-enforced stratification. Additionally, the error bars associated with these measurements were small, demonstrating that the large error bars are primarily due to variability in the incident light intensity. Therefore, consistent incident light intensities maximize the reproducibility of photo-enforced stratification.

The invention claimed is:

1. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor has greater reactivity than the second photopolymerizable polymer precursor,
   wherein the first and second photopolymerizable polymer precursors are selected from the group consisting of methyl methacrylate, 2-(dimethylamino)ethyl methacrylate, 2-(dimethylamino)ethyl acrylate, 2-hydroxyethyl acetate, 2-hydroxyethyl methacrylate, 1,6-hexanediol diacrylate, 1,6-hexanediol dimethacrylate, 2-methoxyethyl acrylate, and combinations thereof.

2. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor has greater reactivity than the second wherein the first and second photopolymerizable polymer precursors are methyl methacrylate and methyl acrylate, respectively.

3. The process of claim 1, wherein the UV light intensity gradient is produced by including a chromophore in the mixture, wherein the chromophore selected from the group consisting of initiators, dyes, light-absorbing monomer precursors, and combinations thereof.

4. The process of claim 3, wherein the chromophore is a photoinitiator.

5. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor has greater reactivity than the second photopolymerizable polymer precursor,
   wherein the mixture further comprises a crosslinking reagent selected from the group consisting of divinyl benzene, poly(ethylene glycol)di(meth)acrylate, poly(propylene glycol)di(meth)acrylate, poly(ethylene glycolranpropylene glycol)di(meth)acrylate, poly(propylene glycol) blockpolycaprolactone di(meth)acrylate, poly(ethylene glycol)blockpolytetrahydrofuran di(meth)acrylate, glycerolethoxylatedi(meth)acrylate, glycerol ethoxylate di(meth)acrylate, and combinations thereof.

6. The process of claim 1, wherein the UV light intensity gradient consists of UV light within an energy range from about 1.4 mW/cm² to about 7 mW/cm².

7. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor is less inhibited by oxygen than the second photopolymerizable polymer precursor,
   wherein the subjecting the mixture to a UV light intensity gradient comprises:
      (a) illuminating the mixture in an oxygen-containing environment for a sufficient time to partially cure the polymeric material;
      (b) removing the oxygen-containing environment from the mixture under non-illuminated conditions; and
      (c) illuminating the mixture in an oxygen-free environment for a sufficient time to fully cure the polymeric material,
   wherein removing the oxygen-containing environment from the mixture of step (b) comprises purging the environment containing the mixture with nitrogen.

8. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor is less inhibited by oxygen than the second photopolymerizable polymer precursor,
   wherein the subjecting the mixture to a UV light intensity gradient comprises:
      (a) illuminating the mixture in an oxygen-containing environment for a sufficient time to partially cure the polymeric material;
      (b) removing the oxygen-containing environment from the mixture under non-illuminated conditions; and
      (c) illuminating the mixture in an oxygen-free environment for a sufficient time to fully cure the polymeric material,
   wherein the first and second photopolymerizable polymer precursors are selected from the group consisting of methyl methacrylate, 2-(dimethylamino)ethyl methacrylate, 2-(dimethylamino)ethyl acrylate, 2-hydroxyethyl acetate, 2-hydroxyethyl methacrylate, 1,6-hexanediol diacrylate, 1,6-hexanediol dimethacrylate, 2-methoxyethyl acrylate, and combinations thereof.

9. A process for manufacturing a polymeric material having a compositional gradient comprising:
   forming a mixture comprising a first photopolymerizable polymer precursor and a second photopolymerizable polymer precursor, wherein the first and second photopolymerizable polymer precursors are present in a 1:1 molar ratio; and
   subjecting the mixture to a UV light intensity gradient using UV light having a wavelength of 313 nm or 365 nm,
   wherein the first photopolymerizable polymer precursor is less inhibited by oxygen than the second photopolymerizable polymer precursor, wherein the subjecting the mixture to a UV light intensity gradient comprises:
(a) illuminating the mixture in an oxygen-containing environment for a sufficient time to partially cure the polymeric material;
(b) removing the oxygen-containing environment from the mixture under non-illuminated conditions; and
(c) illuminating the mixture in an oxygen-free environment for a sufficient time to fully cure the polymeric material,
wherein the first and second photopolymerizable polymer precursors are methyl methacrylate and methyl acrylate, respectively.

10. A process for manufacturing a polymeric material having a compositional gradient comprising:
forming a mixture comprising a first photopolymerizable polymer precursor and a second photopolymerizable polymer precursor, wherein the first and second photopolymerizable polymer precursors are present in a 1:1 molar ratio; and
subjecting the mixture to a UV light intensity gradient using UV light having a wavelength of 313 nm or 365 nm,
wherein the first photopolymerizable polymer precursor is less inhibited by oxygen than the second photopolymerizable polymer precursor,
wherein the subjecting the mixture to a UV light intensity gradient comprises:
(a) illuminating the mixture in an oxygen-containing environment for a sufficient time to partially cure the polymeric material;
(b) removing the oxygen-containing environment from the mixture under non-illuminated conditions; and
(c) illuminating the mixture in an oxygen-free environment for a sufficient time to fully cure the polymeric material,
wherein the first and second photopolymerizable polymer precursors are 2-hydroxyethyl methacrylate and 2-methoxyethyl acrylate, respectively.

11. A polymeric material having a compositional gradient containing a first photopolymerized polymer and a second photopolymerized polymer comprising:
a first polymeric composition having a concentration of the first photopolymerized polymer greater than a concentration of the second photopolymerized polymer; and
a second polymeric composition having a concentration of the second photopolymerized polymer greater than a concentration of the first photopolymerized polymer,
wherein the compositional gradient containing the first and second photopolymerized polymers is formed from a process comprising:
forming a mixture comprising a first photopolymerizable polymer precursor and a second photopolymerizable polymer precursor, wherein the first and second photopolymerizable polymer precursors are present in a 1:1 molar ratio; and
subjecting the mixture to a UV light intensity gradient using UV light having a wavelength of 313 nm or 365 nm,
wherein the first photopolymerizable polymer precursor has greater reactivity than the second photopolymerizable polymer precursor,
wherein the first photopolymerized polymer comprises a majority component derived from reaction of first photopolymerizable polymer precursor and a minority component derived from reaction of the second photopolymerizable polymer precursor, and
the second photopolymerized polymer comprises a majority component derived from reaction of the second photopolymerizable polymer precursor and a minority component derived from reaction of the first photopolymerizable polymer precursor,
wherein the mixture further comprises a crosslinking reagent selected from the group consisting of divinyl benzene, poly(ethylene glycol)di(meth)acrylate, poly(propylene glycol)di(meth)acrylate, poly(ethylene glycolranpropylene glycol)di(meth)acrylate, poly(propylene glycol)blockpolycaprolactone di(meth)acrylate, poly(ethyleneglycol)blockpolytetrahydrofuran di(meth)acrylate, glycerolethoxylatedi(meth)acrylate, glycerol ethoxylate di(meth)acrylate, and combinations thereof.

12. A polymeric material having a compositional gradient containing a first photopolymerized polymer and a second photopolymerized polymer comprising:
a first polymeric composition having a concentration of the first photopolymerized polymer greater than a concentration of the second photopolymerized polymer; and
a second polymeric composition having a concentration of the second photopolymerized polymer greater than a concentration of the first photopolymerized polymer,
wherein the compositional gradient containing the first and second photopolymerized polymers is formed from a process comprising:
forming a mixture comprising a first photopolymerizable polymer precursor and a second photopolymerizable polymer precursor, wherein the first and second photopolymerizable polymer precursors are present in a 1:1 molar ratio; and
subjecting the mixture to a UV light intensity gradient using UV light having a wavelength of 313 nm or 365 nm,
wherein the first photopolymerizable polymer precursor has greater reactivity than the second photopolymerizable polymer precursor,
wherein the first photopolymerized polymer comprises a majority component derived from reaction of first photopolymerizable polymer precursor and a minority component derived from reaction of the second photopolymerizable polymer precursor, and
the second photopolymerized polymer comprises a majority component derived from reaction of the second photopolymerizable polymer precursor and a minority component derived from reaction of the first photopolymerizable polymer precursor,
wherein the first and second photopolymerizable polymer precursors are selected from the group consisting of methyl methacrylate, 2-(dimethylamino)ethyl methacrylate, 2-(dimethylamino)ethyl acrylate, 2-hydroxyethyl acetate, 2-hydroxyethyl methacrylate, 1,6-hexanediol diacrylate, 1,6-hexanediol dimethacrylate, 2-methoxyethyl acrylate, and combinations thereof.

13. A polymeric material having a compositional gradient containing a first photopolymerized polymer and a second photopolymerized polymer comprising:
a first polymeric composition having a concentration of the first photopolymerized polymer greater than a concentration of the second photopolymerized polymer; and
a second polymeric composition having a concentration of the second photopolymerized polymer greater than a concentration of the first photopolymerized polymer,
wherein the compositional gradient containing the first and second photopolymerized polymers is formed from a process comprising:
forming a mixture comprising a first photopolymerizable polymer precursor and a second photopolymerizable polymer precursor, wherein the first and second photopolymerizable polymer precursors are present in a 1:1 molar ratio; and subjecting the mixture to a UV light intensity gradient using UV light having a wavelength of 313 nm or 365 nm, wherein the first photopolymerizable polymer precursor has greater reactivity than the second photopolymerizable polymer precursor, wherein the first photopolymerized polymer comprises a majority component derived from reaction of first photopolymerizable polymer precursor and a minority component derived from reaction of the second photopolymerizable polymer precursor, and the second photopolymerized polymer comprises a majority component derived from reaction of the second photopolymerizable polymer precursor and a minority component derived from reaction of the first photopolymerizable polymer precursor, wherein the first and second photopolymerizable polymer precursors consist of methyl methacrylate and methyl acrylate, respectively.

14. A polymeric material having a compositional gradient containing a first photopolymerized polymer and a second photopolymerized polymer comprising:

a first polymeric composition having a concentration of the first photopolymerized polymer greater than a concentration of the second photopolymerized polymer; and a second polymeric composition having a concentration of the second photopolymerized polymer greater than a concentration of the first photopolymerized polymer, wherein the compositional gradient containing the first and second photopolymerized polymers is formed from a process comprising:

forming a mixture comprising a first photopolymerizable polymer precursor and a second photopolymerizable polymer precursor, wherein the first and second photopolymerizable polymer precursors are present in a 1:1 molar ratio; and subjecting the mixture to a UV light intensity gradient using UV light having a wavelength of 313 nm or 365 nm, wherein the first photopolymerizable polymer precursor has greater reactivity than the second photopolymerizable polymer precursor, wherein the first photopolymerized polymer comprises a majority component derived from reaction of first photopolymerizable polymer precursor and a minority component derived from reaction of the second photopolymerizable polymer precursor, and the second photopolymerized polymer comprises a majority component derived from reaction of the second photopolymerizable polymer precursor and a minority component derived from reaction of the first photopolymerizable polymer precursor, wherein the first and second photopolymerizable polymer precursors consist of 2-hydroxyethyl methacrylate and 2-(dimethylamino)ethyl acrylate, respectively.

15. A polymeric material having a compositional gradient containing a first photopolymerized polymer and a second photopolymerized polymer comprising:

a first polymeric composition having a concentration of the first photopolymerized polymer greater than a concentration of the second photopolymerized polymer; and a second polymeric composition having a concentration of the second photopolymerized polymer greater than a concentration of the first photopolymerized polymer, wherein the compositional gradient containing the first and second photopolymerized polymers is formed from a process comprising:

forming a mixture comprising a first photopolymerizable polymer precursor and a second photopolymerizable polymer precursor, wherein the first and second photopolymerizable polymer precursors are present in a 1:1 molar ratio; and subjecting the mixture to a UV light intensity gradient using UV light having a wavelength of 313 nm or 365 nm, wherein the first photopolymerizable polymer precursor has greater reactivity than the second photopolymerizable polymer precursor, wherein the first photopolymerized polymer comprises a majority component derived from reaction of first photopolymerizable polymer precursor and a minority component derived from reaction of the second photopolymerizable polymer precursor, and the second photopolymerized polymer comprises a majority component derived from reaction of the second photopolymerizable polymer precursor and a minority component derived from reaction of the first photopolymerizable polymer precursor, wherein the first and second photopolymerizable polymer precursors consist of 2-(dimethylamino)ethyl methacrylate and 2-hydroxyethyl acetate, respectively.

16. The process of claim 7, wherein the illuminating the mixture of steps (a) and (c) comprises using UV light within an energy of at least about 1.4 mW/cm$^2$.

17. The polymeric material of claim 11, wherein the UV light intensity gradient is produced by including a chromophore in the mixture, wherein the chromophore selected from the group consisting of initiators, dyes, light-absorbing monomer precursors, and combinations thereof.

18. The polymeric material of claim 17, wherein the chromophore is a photoinitiator.

* * * * *